United States Patent [19]

Milgram et al.

[11] Patent Number: 5,175,616
[45] Date of Patent: Dec. 29, 1992

[54] STEREOSCOPIC VIDEO-GRAPHIC COORDINATE SPECIFICATION SYSTEM

[75] Inventors: Paul Milgram, Toronto; David Drascic, Downsview; Julius J. Grodski, Toronto, all of Canada

[73] Assignee: Her Majesty the Queen in right of Canada, as represented by the Minister of National Defence of Canada, Ottawa, Canada

[21] Appl. No.: 562,868

[22] Filed: Aug. 3, 1990

[30] Foreign Application Priority Data

Aug. 4, 1989 [CA] Canada .................................. 607669

[51] Int. Cl.⁵ .......................................... H04N 13/00
[52] U.S. Cl. ..................................... 358/88; 358/91; 340/709
[58] Field of Search ..................... 358/88, 89, 91, 92; 360/706, 709, 729; 364/522

[56] References Cited

U.S. PATENT DOCUMENTS

| | | | |
|---|---|---|---|
| 4,214,267 | 7/1980 | Roese et al. | 358/88 |
| 4,431,265 | 2/1984 | Benton | 358/88 |
| 4,649,425 | 3/1987 | Pund | 358/88 |
| 4,751,570 | 6/1988 | Robinson | 358/88 |
| 4,808,979 | 2/1989 | DeHoff et al. | 340/709 |
| 4,812,829 | 3/1989 | Ebina et al. | 340/709 |
| 4,851,901 | 7/1989 | Uwasaki | 358/88 |

FOREIGN PATENT DOCUMENTS 0038915 2/1990 Japan.

*Primary Examiner*—John K. Peng
*Attorney, Agent, or Firm*—Nixon & Vanderhye

[57] ABSTRACT

A stereoscopic image generator for superimposing a stereographic pointer video signal onto a composite standard video signal, the genrator comprises a computer for generating the stereographic pointer video signal in response to an input signal representive of the three dimensional coordinates of a point in a three dimensional video image, a video synchronizing circuit for receiving the composite standard video signal and delivering a synchronization signal to the computer, and a video keying circuit for receiving the composite standard video signal and the stereographic pointer video signal and superimposing the stereographic pointer video signal onto the composite standard video signal to produce a single combined video signal, the single combined video signal allowing the stereographic pointer video signal and the composite standard video signal to be viewed together simultaneously on the same video screen.

11 Claims, 13 Drawing Sheets

FOR THE LEFT CAMERA, GIVEN POINT $A(p,q,r)$
AND THE FOCAL LENGTH $f$,
THE LOCATION ON THE IMAGE SENSOR $A_{IS}(lx,ly)$
CAN BE DETERMINED BY:
$lx = f(p/r)$
$ly = f(q/r)$

SIMILARLY FOR THE RIGHT CAMERA, GIVEN POINT $A(u,v,w)$
THE LOCATION ON THE IMAGE SENSOR $A_{IS}(rx,ry)$
CAN BE DETERMINED BY:
$rx = f(u/w)$
$ry = f(v/w)$

CAMERA CONVERGENCE ANGLE
$2\phi = 2 \text{ atan}(s/c)$

D: DISTANCE FROM EYES TO VIEWING SCREEN $D_B$: DISTANCE FROM EYES TO APPARENT LOCATION OF OBJECT B

IPD: INTER-PUPILLARY DISTANCE

PTD: PERCEIVED TARGET DISTANCE

EYE CONVERGENCE ANGLE:
$\alpha = 2 \text{ arctan}(2 D_B / IPD)$

STEREOSCOPIC VIDEO-GRAPHIC COORDINATE SPECIFICATION SYSTEM

The present invention relates, in general, to a stereoscopic television systems of the type employed in teleoperated robotic systems and remote surveillance systems and, more specifically, to a stereographic video graphic three dimensional coordinate specification system for use in such systems.

BACKGROUND OF THE INVENTION

The present invention is concerned with the problem of enabling a human operator of a teleoperated system (such as a mobile explosive ordnance disposal robot) or of a remote surveillance system, to visualise efficiently the location and orientation of various objects and obstacles in a remote environment, and to visualise efficiently the location and orientation of the remote system, or teleoperator, itself with respect to the remote environment, that is, with respect to various objects and obstacles in that environment, and to operate efficiently the various functions of the remote system, that is, to control its locomotion and to operate any of the teleoperator's effectors, such as robotic arms, grippers, weapons, etc., with respect to the remote environment. The terms "teleoperator" or "robot" include any system, such as a mobile robot, which can be controlled at a distance and from which visual information is fed by means of a video signal to a human controller. The terms also include a video camera system alone, without remote vehicle platform or telemanipulator, as used for remote surveillance.

In conventional systems, the ability to carry out these functions is limited primarily by the ability of the human operator to view the remote environment. Typically, a closed circuit monoscopic video system is used with such systems. A closed circuit monoscopic video system includes a single video camera mounted on or near the mobile robot and the human operator views the remote environment via a single video monitor. The term "remote" is used here in a general sense, to refer to any separation between the observer and the camera(s), that is, either a physical or a temporal or a functional separation. There are a number of visualisation problems which commonly accompany such viewing systems and these arise from the factors briefly discussed below.

First, the resolution of the closed circuit video system is typically about 330-360 horizontally resolvable lines, depending on the quality of the (colour, solid state) video camera, optics, and monitor. This is much less than that of the human visual system during direct viewing and therefore limits the ability of the human operator to detect and recognise details. Second, unless expensive coupling hardware between the human operator's head movements and the remote camera's pan and tilt unit has been provided, which is typically not the case at present, the ability of the human operator to "look around" and assess the remote environment comfortably is greatly restricted. Third, the relatively small field of view afforded by the camera lenses being used is typically around 30°-40°, depending on the focal length of the lens, is much less than the natural field of view of about 120° of the human binocular visual system. Further, the usual reduction in scale due to the size of the viewing screen restrict the ability of the human operator to assimilate important information from the remote visual environment, such as estimating the rate at which objects are streaming through the camera's visual field, information which is necessary for the operator to estimate robot speed and to control robot locomotion accurately. Fourth, single camera video systems can, under many circumstances, severely restrict the ability of the human operator to estimate the distances between objects in the remote environment, as well as to detect the presence of objects or obstacles which otherwise tend to blend into the visual background.

The present invention is particularly concerned with the fourth problem addressed above, although it does have implications for the other viewing problems mentioned. In order to estimate "depth" information with monoscopic video systems, i.e. the relative distance of objects in the direction perpendicular to the plane of the viewing screen, the main visual cues available include relative object size wherein objects closer to the camera appear larger, motion parallax involving relative change of visual angle of moving objects, occlusion wherein closer objects block off farther objects located behind them, surface texture and lighting. Stereopsis, the important ability to perceive volumetric information by means of binocular disparity, i.e. the differences between the projections of the parts of an object onto the two retinas of an observer's eyes, is not achievable with monoscopic television systems.

In some operations carried out with remotely manipulated systems, it is necessary to estimate the distance from the robot, or from the remote cameras, to a particular object or, more particularly, to estimate the spatial coordinates of a specified object relative to the robot. Furthermore, in some operations, it is necessary to estimate the distance between two particular objects or specific points in the remote vicinity of the teleoperator. For example, an operator might want to know the distance to a particular object for purposes of orientation, weapon aiming, manoeuvring, etc. Similarly, the operator might want to indicate a particular point in space in order to issue some kind of "go to" command to the locomotion or manipulator control system, in a higher order control mode than is presently possible. In the case of a mobile explosive ordnance disposal robot, for example, instead of aiming the robot's weapon at a target manually, if the operator were to have the relative spatial coordinates of the designated target available, it would be a straightforward matter to design a microprocessor based system to direct the weapon towards the specified target.

For all of the above operations, the basic objective is to automate various teleoperator functions and thereby to improve operational efficiency, by taking advantage of the ability to make precise numerical computations afforded by available computing power. The problem in all of these applications, however, is the lack of an adequate means to communicate accurately to the computer system the essential information about spatial coordinates of objects of interest in the robot's surroundings.

Present techniques for addressing the problems outlined above consider separately two levels of problems. The first problem is with respect to the human operator's perception of the spatial relationship among various objects in the vicinity of the robot and the second problem is that of communicating the spatial coordinates of designated perceived objects or locations to the local computer system.

At present, the most common means of addressing the first problem is to continue to use monoscopic video and to rely on the various monoscopic depth cues listed above. A more advanced means of addressing the problem is to install a stereoscopic viewing capability on the mobile robot. Under many circumstances this will greatly improve the human operator's perception of the remote environment and should especially enhance operations involving, for example, (negative) obstacle avoidance, gripping and detection of camouflaged objects.

Stereoscopic video systems are used in practice to allow an observer to perceive volumetric information about all three dimensions of a (remote) environment. That is, instead of the two dimensional images displayed on the surface of a conventional video monitor, the viewer of a stereoscopic display is able also to perceive depth and distance directly within the image. In order to accomplish this, the two images produced by the two cameras at different viewpoints must be presented to the corresponding eyes of the observer separately, on either one or more than one display surface. The term "display surface" will therefore be taken here to refer to one or more display devices which are used to present left and right eye information separately to the observer's left and right eye respectively.

With respect to the second problem mentioned, there is at present no adequate practical means for the human operator to estimate an object's spatial coordinates, other than by estimating this solely on the basis of visual observation (either monoscopically or stereoscopically). On the other hand, it is possible to accomplish such measurements automatically, by making use of suitable machine vision equipment. Typically this would comprise suitably arranged remote camera(s), hardware and software for digitising camera images, pattern recognition software for recognising object features in the camera images, and software for computing the requisite spatial coordinates of designated objects of interest.

The obvious drawback to achieving the automated solution to the second problem outlined above is the expense involved in adding the necessary hardware and software components. Equally important, however, is the reliability of such an arrangement. Although great progress has been made in the area of machine vision, the general problem can not as yet be considered to be "solved". In real operational environments, potentially under poor lighting conditions, problems associated with using computer software to identify integral objects, whose features may not be easily distinguishable within a noisy and possibly complex visual environment, can be great and could impede performance of the teleoperator system as a whole. Furthermore, even if the computing power of the system is able to identify individual objects within the steroscopic camera images, the problem still remains of how to enable the human operator to indicate to the computer system which of those objects in the visual scene are of interest to the human operator.

SUMMARY OF THE INVENTION

The present invention seeks to provide a system which enables an operator to perceive on a single video monitor volumetric information about all three dimensions in a remote environment, indicate to the computer system which of those objects in the visual scene are of interest and accurately communicate to the computer system the essential information about the spatial coordinates of objects of interest in the remote environment.

In accordance with the present invention, this is achieved by providing a method and an apparatus which synchronously superimposes a virtual, sterographic pointer video signal onto the sterographic video signal of a remote environment so as to allow the two signals to be displayed together as a single combined video signal on a single viewing screen.

This arrangement enables a human operator to not only perceive a three dimensional image of the remote visual surroundings, but also to manipulate the sterographic pointer within that image. The pointer appears to "float" within the real video environment and can be moved about by the operator, in three dimensions, within that environment. The operator is thus able to "place" this virtual pointer "on" or "near" any object being observed on the screen. The system is provided with data respecting the magnification, separation and orientation of the optics of the two cameras which generate the video image as well as data respecting the cameras' light sensing electronic elements so as to enable it to scale the dimensions of the pointer appropriately. Thus, the system can easily display at any time required, or continuously if necessary, the actual quantitative scaled spatial corrdinates of the virtual pointer in terms of its location within the actual world recorded by the video cameras, as perceived by the human observer.

The pointer may be of any desired shape, such as a "V", an arrow, or cross-hairs. One especially useful embodiment of the pointer is a free-floating cursor tied to the end of a "rubber band", which is fixed at some point in space, such as in the vicinity of the camera system, so as to indicate clearly to the operator the "pathway" to the cursor through three dimensional space. A particularly useful embodiment of the "rubber band" option is a so called "tape measure" option whereby the stereographic pointer is used to fix one end of the "rubber band" at a point in the three dimensional space designated by the operator and the "rubber band" is then "stretched" by the operator to a second designated point in space. The real-world distance between the two points can then be computed and displayed on the display device.

Accordingly, one aspect of the present invention is generally defined as a steroscopic image generator for superimposing a stereographic pointer video signal onto a composite standard video signal, the generator comprising computation means for generating the sterographic pointer video signal in response to an input signal representative of the three dimensional coordinates of a point in a three dimensional video image, video synchronizing circuit means for receiving the composite standard video signal and delivering a synchronization signal to the computation means, and video keying circuit means for receiving the composite standard video signal and the sterographic pointer video signal and superimposing the stereographic pointer video signal onto the composite standard video signal to produce a single combined video signal, the single combined video signal allowing the stereographic pointer video signal and the composite standard video signal to be viewed together simultaneously on the same video screen.

Yet another useful feature of the present invention enables automatic adjustment of the stereoscopic cameras by solving the dynamic viewpoint adjustment problem. The advantages of dynamically optimising the camera configuration relative to the particular viewing operation include eliminating excessive convergence or divergence of the observer's eyes, reducing eyestrain, fatigue and discomfort, minimising stereoscopic depth distortion and increasing stereoscopic depth resolution. In order to optimise the camera configuration it is necessary both to know where the observer's focus of attention is and to be able to control dynamically both degrees of freedom of the cameras, that is, the camera separation and the angle of convergence of the cameras. The present invention provides both of those capabilities.

According to the present invention, an observer who is viewing the remote environment by means of the stereoscopic video system employs a three degree of freedom pointing device, which communicates with the stereographic pointer via a control computer, to indicate where in the three dimensional environment he is interested in surveying, examining more closely, making measurements, etc. Any shift of attention indicated by movement of the stereographic pointer within an x-y plane, parallel to the display surface, can be accompanied by remote control of the cameras' pan and tilt angles and/or by means of remote translation of the cameras with respect to the x-y plane. Any shift of attention indicated by movement of the stereographic pointer in the z-direction, perpendicular to the x-y plane, however, may necessitate recomputation of the cameras' separation and angle of convergence, according to some optimisation routine. Similarly, the observer may use the pointer to indicate that an increased or decreased stereoscopic depth resolution is needed at that particular distance from the cameras, which may also necessitate recomputation of the cameras' separation and angle of convergence, according to some optimisation routine.

Once the focus of attention, or intended focus of attention, of the observer has been communicated to the control computer by means of the stereographic pointer, an optimisation routine is invoked which computes the separation and angle of convengence of the cameras which are suitable for that particular focus of attention, or intended focus of attention. In addition to the observer's focus of attention in three dimensional space, as indicated by the stereographic pointer, the optimisation routine takes into account the focal length of the lenses used, the gain of the display system and the distance of the observer's eyes from the display surface. It should also be noted the the optimisation routine takes into account variable focal lengths due to zooming of the lenses. The optimisation routine also takes into account the history of recent adjustments to the camera configuration, in order to prevent adjustments to the camera configuration which may be too rapid. Under some circumstances, it is advantageous for the camera alignment to be modified only whenever the location of the stereographic pointer deviates beyond a specified distance from the point of convergence of the cameras. This can be initiated either upon request of the user, or automatically by the control computer according to a defined criterion, or on a continuous basis.

Once the updated separation and angle of convergence of the cameras are computed by the optimisation routine, control signals are generated which drive a suitable mechanism which controls the two degree of freedom camera alignment control system. A preferred mechanism is comprised of two stepper motors which operate twin roman screws having left and right handed threads on opposing halves of their shafts, upon which ride the two camera platforms. By turning both screws appropriately, the two platforms move together and apart symetrically, which allows for adjustment of camera separation. By turning only one screw, or by turning both screws in opposite directions, the angle of convergence, or divergence, of the two cameras can be adjusted. Combining both of these modes of adjustment therefore allows independent adjustment of camera separation and camera convergence angle.

Accordingly, a further aspect of the present invention is generally defined as an interactive camera alignment control system for dynamically configuring the separation and convergence angle of a pair of cameras of a camera system so that the point of convergence of the cameras is as close as possible to the centre of an observer's interest within a video scene produced by the cameras being viewed, the camera system including means for mounting the cameras for movement toward and away from one another and for angular displacement of their lines of sight from a reference plane and means responsive to electrical control signals for adjusting the separation and convergence angle of the cameras, the cameras being operable to produce first and second standard video signals having alternating odd and even raster scan field video images, comprising means for combining the first and second standard video signals to produce a composite standard video signal comprised of alternating even video images from one of the first and second cameras and odd images from the other of the first and second cameras, means for producing an electrical signal indicative of the point or region of interest within the scene, means for superimposing onto the composite standard video signal a raster graphic output video signal of a virtual, stereographic pointer representative of the three dimensional coordinates of a point in a three dimensional video image to produce a multiplexed, composite video signal, means for displaying the multiplexed, composite video signal, means responsive to the coordinates of the pointer for producing the camera separation and convergence angle control signals and transmitting the control signals to the control signal responsive means whereby to cause adjustment of the camera separation and convergence angle.

From an operational viewpoint, there are a number of novel applications of such a system. One application involves interactive, real-time, on-line rangefinding, whereby a combined computer/video system computes and displays the distance from the remote camera system to the object indicated by the human operator, or alternatively, between objects indicated by the human observer. Another application relates to aiming of weaponry wherein the operator points to a target in three dimensional space and the computer computes its relative spatial coordinates and the consequent necessary orientation of the telemanipulator. Still another application relates to high order manual vehicle control wherein, rather than steering a remotely operated vehicle manually to a particular point by means of continuous directional and velocity control, the stereographic pointer is used to indicate the desired end point, which, once completely specified in spatial coordinates relative to the vehicle's frame of reference, can be approached under the control of a control system (at any desired rate). A still further application is high order manual manipulator control wherein, rather than manually controlling each of the joints of a multi-degree of freedom robotic arm in order to move the end effector to a desired point in space, or even rather than controlling the end effector directly by means of resolved motion control, the stereographic pointer is used to indicate the desired end point, which, once completely specified in spatial coordinates relative to the manipulator's frame of reference, can be approached by the end effector under the control of the computer control system (at any desired rate).

The present invention can be achieved by existing, off-the-shelf technology and therefore is relatively inexpensive. The invention combines closed circuit stereoscopic video technology with stereoscopic computer graphic technology and uses a continuous, three degree of freedom computer input device and human pattern recognition and decision making capabilities, rather than those of a programmed microprocessor, to create a "virtual" pointing device for performing measurements in a "real" remotely viewed environment, thereby obviating the need for a relatively expensive and potentially unreliable and/or inaccurate "artificially intelligent" system.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
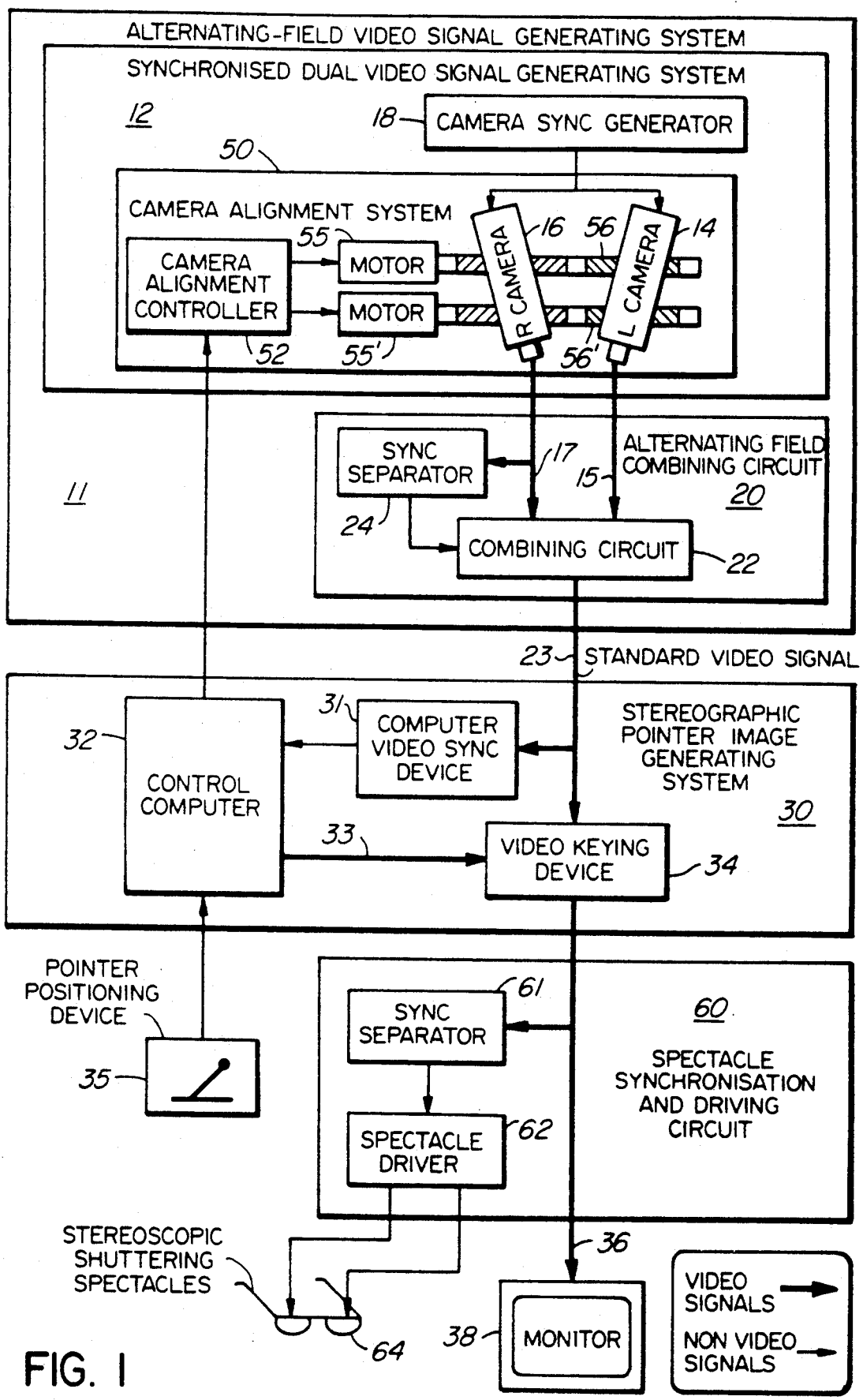
FIG. 1 is a block diagrammatic view of a preferred embodiment of a stereoscopic television system with a stereographic pointer according to the present invention.

FIG. 1 illustrates the preferred embodiment of the present invention, comprising a stereoscopic television system 10 which provides virtual stereographic pointer images superimposed upon real-time live three dimensional video images produced by an alternating-field stereoscopic television system. In general, the present invention includes an alternating field video signal generating system 11 which includes a pair of synchronized cameras 14 and 16. The cameras may be mounted on a robot or may form part of a remote surveillance system. As explained more fully later, the individual video signals produced by the cameras are processed by an alternating field combining circuit 20 to produce a single composite video signal 23. Signal 23 is delivered to a stereographic pointer image generator 30 where a pointer video signal, having the same format as signal 23, is superimposed onto signal 23. The resulting signal 36 is delivered to a video display monitor 38 on which, using stereoscopic shuttering spectacles 64, a user is able to perceive three dimensional images which will include the images recorded by the cameras as well as the stereographic pointer. Further, using a pointer positioning device 35, the user is able to move the pointer on the screen within the three dimensional images captured by the cameras and place the pointer on or near any object observed on the screen. This, in turn, allows a control computer 32 to control the positioning of the cameras as well as the operation of the robot, if a robot is used.

Before describing the invention in greater detail, it would be useful to review FIGS. 7 and 8.

Figure 7A:
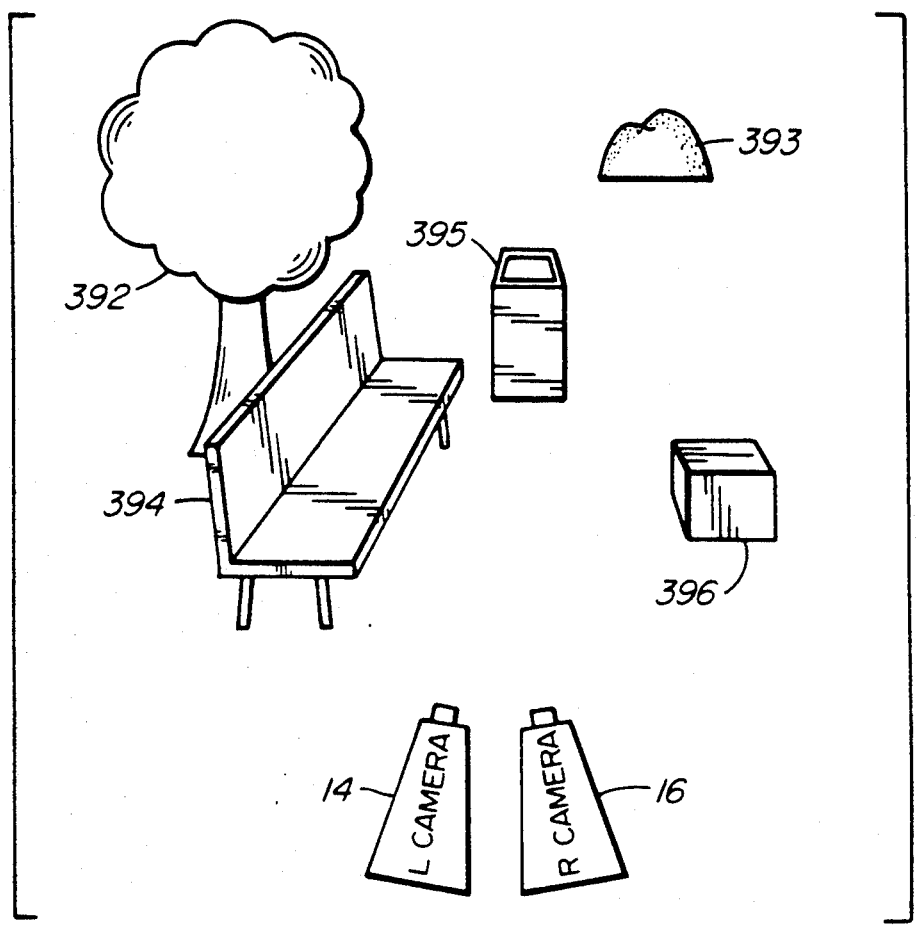
FIG. 7a is a sketch of a simulated park scene.
Figure 7B:
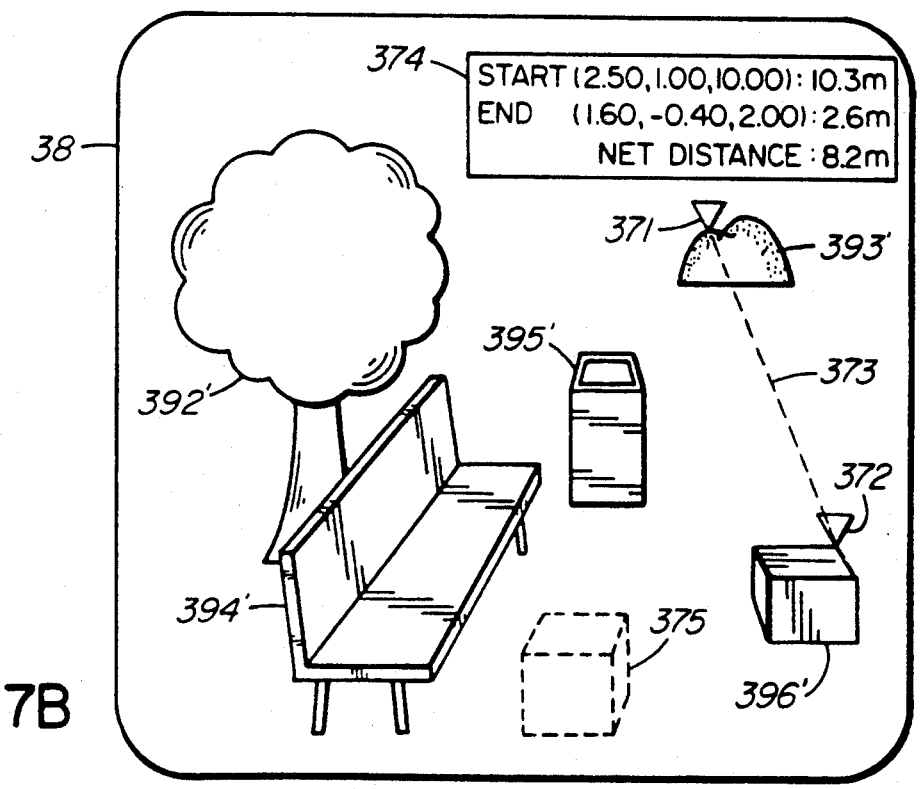
FIG. 7b is a sketch of how the park scene of FIG. 7a might appear on a video monitor where, by using suitable stereoscopic spectacles, an observer would perceive the scene three dimensionally, that is, he would directly perceive the relative distances of the various objects in the scene viewed via the cameras, by using stereoscopic depth cues, rather than just monoscopic depth cues.

FIG. 7 is an illustration of how the relationship between a hypothetical real-world video scene and the same scene viewed stereoscopically on a monitor with superimposed stereoscopic graphics might look. FIG. 7a is a sketch of a simulated park scene, comprising a park bench 394, in front of a tree 392, beside a dustbin 395, with a rock 393 in the background and a box 396 somewhere off to the right. The simulated scene is being viewed through a pair of stereoscopic video cameras 14 and 16. FIG. 7b is a sketch of how the same scene might appear on a video monitor 38, where it is to be understood that, by using suitable stereoscopic spectacles 64, an observer would perceive this scene three dimensionally; that is, he would directly perceive the relative distances of the various objects in the scene viewed via the cameras, by using stereoscopic depth cues, rather than just monoscopic depth cues.

One embodiment of the stereographic pointer is shown by the shaded triangle pointer 371, which in this example has been placed at the top of the rock 393' by the observer, using the Pointer Positioning Device 35. It is to be understood that, to the observer, the stereographic pointer 371 would be perceived as hovering exactly above that corner of the rock in three dimensional space, that is, at the exact same distance from the cameras as the real corner of the rock 393 itself. It is important to note, however, that the image of the stereographic pointer 371 in FIG. 7b is a virtual image, that is, there is not a corresponding image in the real video scene in FIG. 7a.

One feature of the present invention is the capability of computing, according to the method illustrated in FIG. 5 described later, the equivalent distance from the midpoint of the camera axis to the equivalent location of the virtual pointer within the corresponding real video world, and displaying the results of this computation to the observer. In FIG. 7b this distance is illustrated by the "Start" distance within the readout block 374 on the screen.

Another feature of the present invention, which can not be illustrated in FIG. 7b due to the two dimensionality of the figure, is the capability of displaying the computational readouts associated with the pointer position, or the entire readout block 374, or any other symbols or figures, alphanumeric or pictorial or otherwise, at any desired equivalent distance within the corresponding real visual scene. This is accomplished simply by displaying the information stereoscopically, at the same equivalent distance within the real world as any desired equivalent stereographic pointer location, according the methods of computing the necessary binocular parallax outlined in this disclosure. This feature is in contrast to the conventional method whereby information is typically displayed at the same plane as the viewing screen, that is, monoscopically.

Yet another feature of the present invention is the so-called "tape measure" option. As illustrated in FIG. 7b, the stereographic pointer 371 can also be moved by the observer, using the Pointer Positioning Device 35, from its original "Start" position, to any other position, indicated in the figure by the second stereographic pointer 372. Because the equivalent position of the stereographic pointer within the corresponding real video world is always known, according to the method illustrated in FIG. 5, it is possible not only to compute the new equivalent position of the stereographic pointer 372, but also to compute the net scalar distance between the old and the new pointer positions 371 and 372. These values are illustrated within the readout block 374 as the "End" position and the "Net Distance". Another fundamental feature of the tape measure option is the ability to highlight on the viewing screen the equivalent three dimensional trajectory 373 of the pointer 372 relative to the "Start" pointer 371. Note that neither the stereographic pointers 371 and 372, nor the stereographic trajectory line 373 appear in the equivalent real-world illustration shown in FIG. 7a.

Figure 8A:
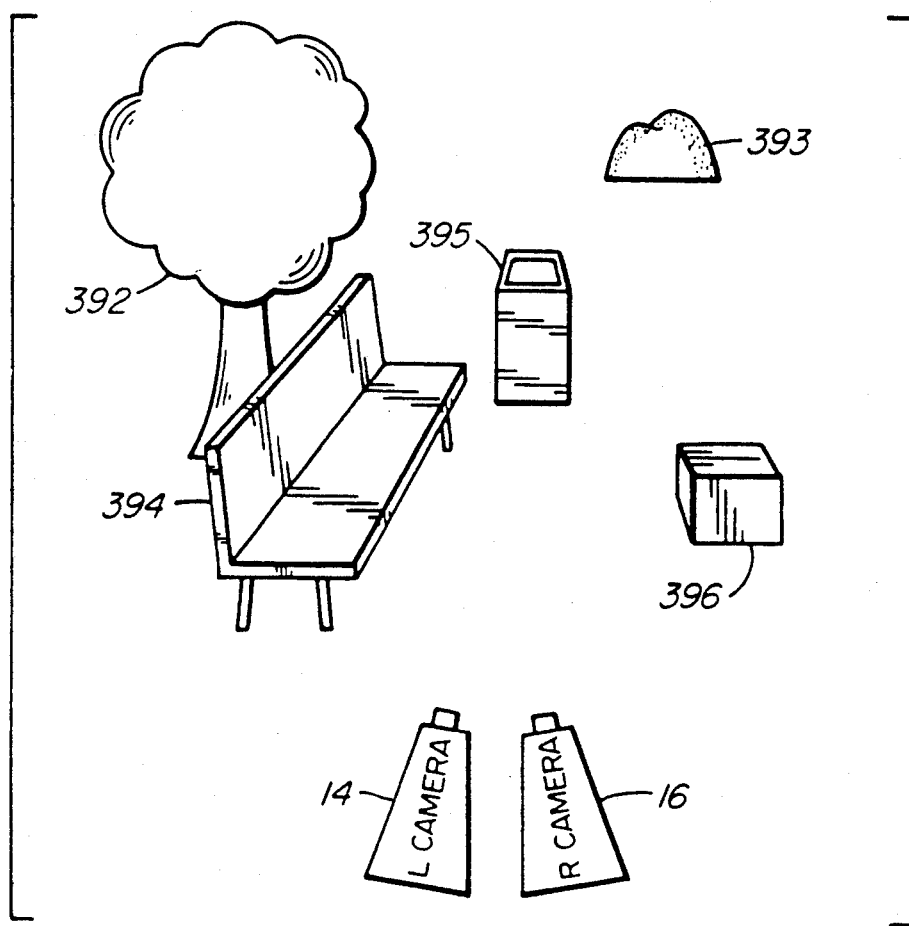
FIGS. 8a and 8b are similar to FIGS. 7a and 7b but illustrating an embodiment in which the pointer is used to indicate and/or highlight a monitor a virtual three dimensional trajectory through the equivalent hypothetical real video scene.
Figure 8B:
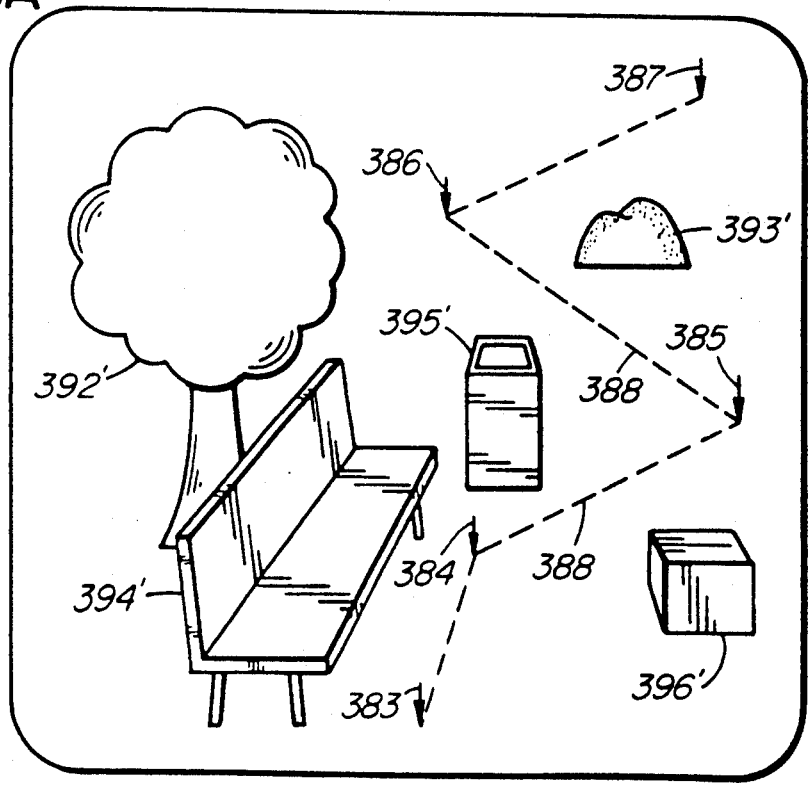

An extension of the tape measure option is illustrated in FIGS. 8a and 8b, wherein the context of the two figures parallels exactly that of FIGS. 7a and 7b. Whereas in FIG. 7b the observer has used the stereographic pointer as an instrument to measure the locations of specific objects or points, or distances between those objects or points, within the real three dimensional video scene, in FIG. 8b the observer has used the pointer principally as a means to indicate and/or highlight a virtual three dimensional trajectory 388 through the equivalent hypothetical real video scene shown in FIG. 8a. In this example, the observer has moved the stereographic pointer, here shown as an inverted arrow 383 (as opposed to the inverted shaded triangle shape depicted in FIG. 7b) to an initial point within the real three dimensional video scene. He has then caused the stereographic pointer to move to five other subsequent points, depicted in the figure as stereographic pointers 384, 385, 386 and 387. The virtual three dimensional trajectory line 388 has been drawn to illustrate a pathway through these various waypoints. Note that neither the virtual three dimensional trajectory line 388, nor the stereographic pointers 383, 384, 385, 386 and 387, appear within the illustration of the corresponding real world scene in FIG. 8a. This feature of superimposing a virtual three dimensional trajectory on top of a real video scene has applications in navigation, training, telerobotic control, robot path planning, highlighting the predicted course of manipulators or projectiles, as well as any other situation in which it could be useful to indicate to a human observer a potential three dimensional pathway through a real remote scene.

Yet another feature of the present invention is the ability, in addition to the superimposed stereographic pointers, tape measures and trajectories illustrated thus far, to consider the concept of the stereographic pointer in a more general sense by superimposing on the viewing screen stereoscopic images of more "complex" three dimensional objects. In generating such images, the methods described above for computing the screen coordinates of an arbitrary stereographic pointer located at a particular equivalent location within the real video world can be applied in the general case, to compute the screen coordinates of the vertices, for example, of any more complex three dimensional object which is to be drawn within the corresponding real video world. This feature is illustrated in FIG. 7b by the virtual box 375, which has been superimposed next to the front of the park bench 394'. Note again that no similar box appears in the equivalent real-world illustration shown in FIG. 7a. Such a capability is useful for applications where it is necessary to be able to visualise how or where a particular object will appear within a visual scene, such as during a design project, or for training purposes, or for superimposing "predictive displays" of future object locations and attitudes, or for graphically superimposing concepts such as "field intensities", etc.

In addition, if the geometrical measurements and location of a particular object are known to the computer system, the same object can be superimposed graphically onto the real video scene, for example using wireframe imaging, as a means of checking the integrity of the display system and/or the object location measuring system, by verifying whether the real and the virtual objects being displayed are indeed aligned. Another related application of this capability is to superimpose a graphical "wireframe" image of an object onto the corresponding real object as a means of enhancing the view of the boundaries of that object, such as for when the video display suffers from poor lighting conditions, glare, scatter, occlusion, etc. Object boundaries can also be enhanced by adding colour, or shading, or highlighting to the virtual stereographic image, or portions of that image, permitting one to indicate to the observer various types of information, such as proximity warnings. Clearly, the examples mentioned here are representative only, and do not limit the potential range of applications of the present invention.

Figure 2:
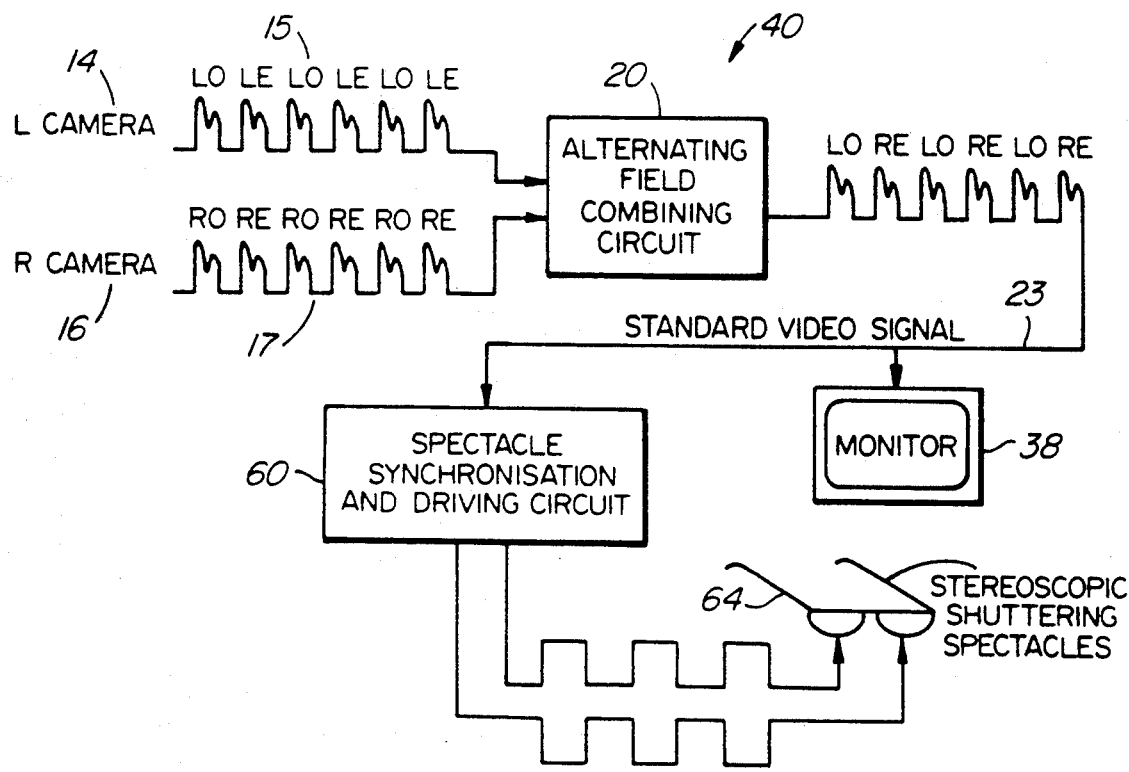
FIG. 2 is a schematic diagram of a typical alternating-field stereoscopic television system.

Before describing the invention in greater detail, it would be useful to review the operation of a typical stereoscopic television system. FIG. 2 illustrates a stereoscopic television system generally designated by reference numeral 40 in which individual video signals 15 and 17, produced by synchronised left and right video cameras 14 and 16 respectively, are processed by alternating field combining circuit 20 to produce a single composite interlaced standard video signal 23, in conventional analogue format, such as NTSC, PAL, SECAM and the like. As illustrated in FIG. 2, the left (L) camera video signal 15 comprises alternating odd (O) and even (E) raster scan fields, labelled LO and LE respectively. Similarly, the right (R) camera video signal 17 comprises alternating odd (O) and even (E) raster scan fields, labelled RO and RE respectively. The resulting single composite interlaced standard video signal 23 is comprised of a repeating pattern of alternating fields, LO, RE, LO, RE, etc. which is fed both to video monitor 38 and to spectacle synchronisation and driving circuit 60. This results in driving signals fed in counterphase to stereoscopic shuttering spectacles 64, which act to "separate" for the observer the odd and even field video images being displayed on the video screen 38 into left and right eye images, respectively, to thereby allow the observer to perceive three dimensional images on the display screen. With no loss of generality, it is understood that the standard video signal 23 illustrated in FIG. 2 could equally well be depicted as comprising the alternating field pattern LE, RO, LE, RO, etc.

With reference to FIG. 1, the present invention will be seen to include an alternating-field video signal generating system 11 for producing composite interlaced standard video signal 23 in conventional analogue format, such as NTSC, PAL, SECAM and the like, comprising a combination of alternating left and right field video images. System 11 generally comprises a synchronised dual video signal generating system 12 for generating a pair of synchronised video signals, comprising a left camera video signal 15 and a right camera video signal 17, which are fed to alternating-field combining circuit 20. System 12 generally takes the form of a pair of video cameras, left camera 14 and right camera 16, which are physically aligned by camera alignment system 50 having a camera alignment mechanism 51 (see FIG. 6) under the control of camera alignment controller 52, and are synchronised by camera sync generator circuit 18. Alternatively, system 12 could comprise a special purpose dual-optic, single-camera stereoscopic video system (not shown). An alternative embodiment of circuit 11, for off-line images, could comprise a video playback system (not shown).

Figure 3:
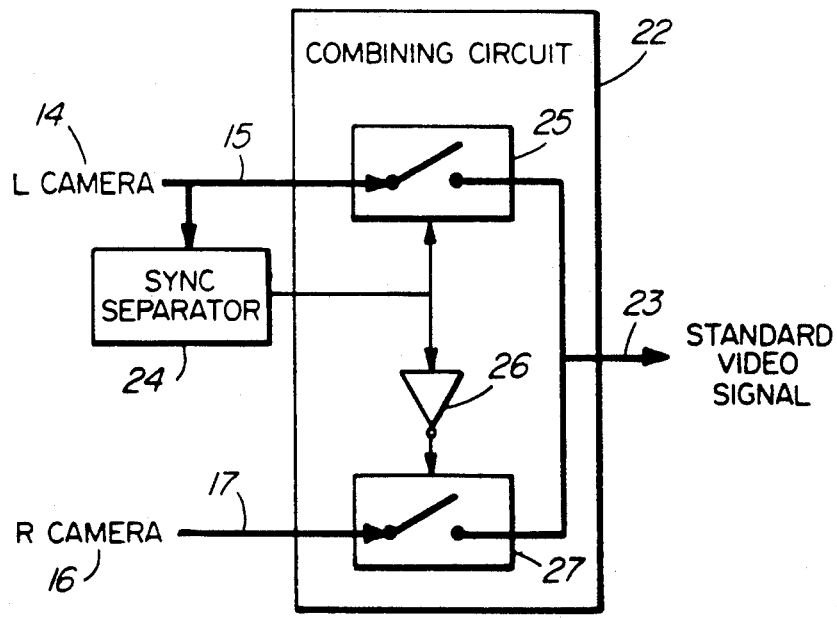
FIG. 3 is a block diagrammatic view of an alternating field combining circuit.
Figure 4A:
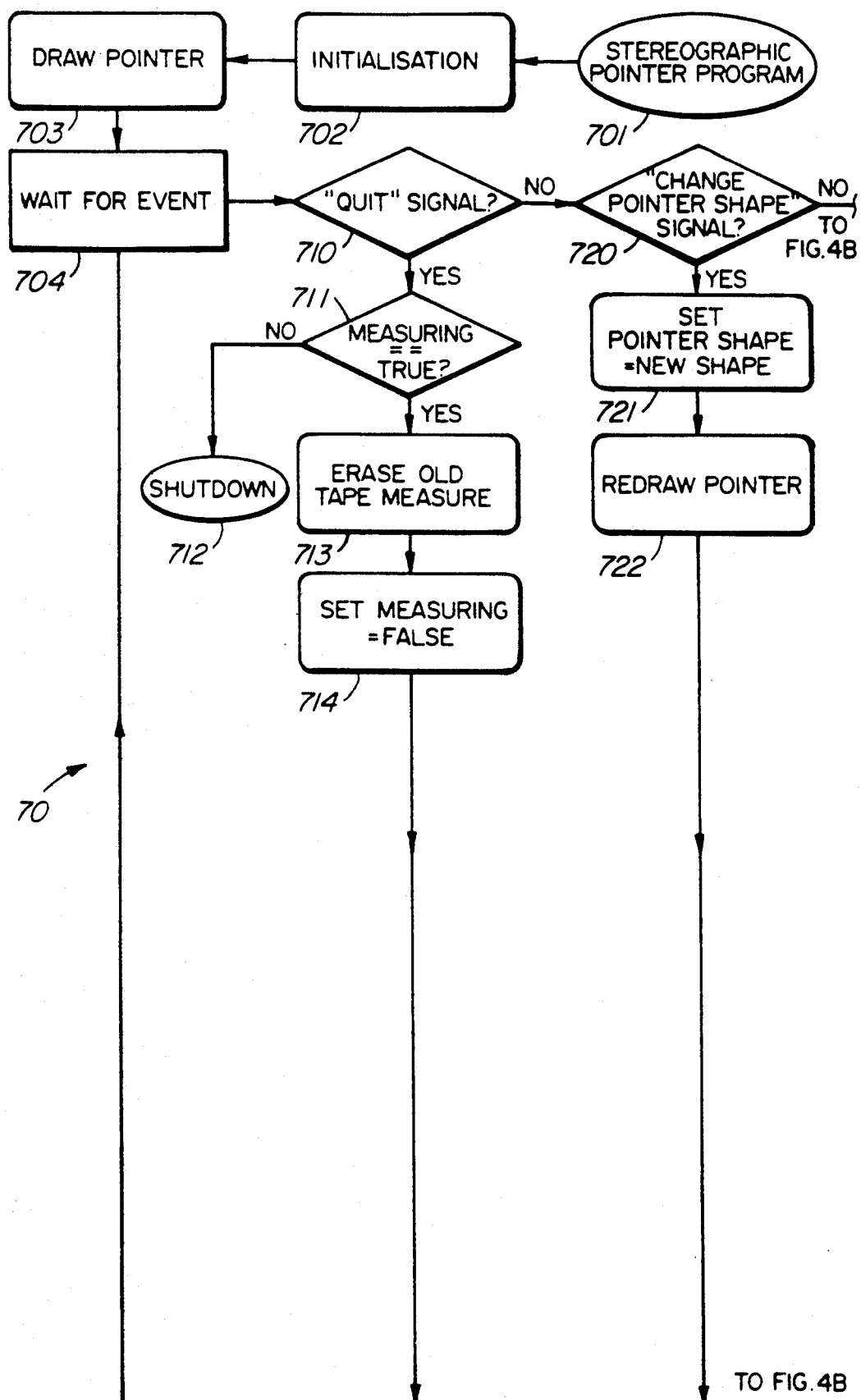
FIGS. 4a, 4b, 4c, and 4d are flow chart diagrams of one embodiment of interactive stereographic pointer display logic according to the present invention.
Figure 4B:
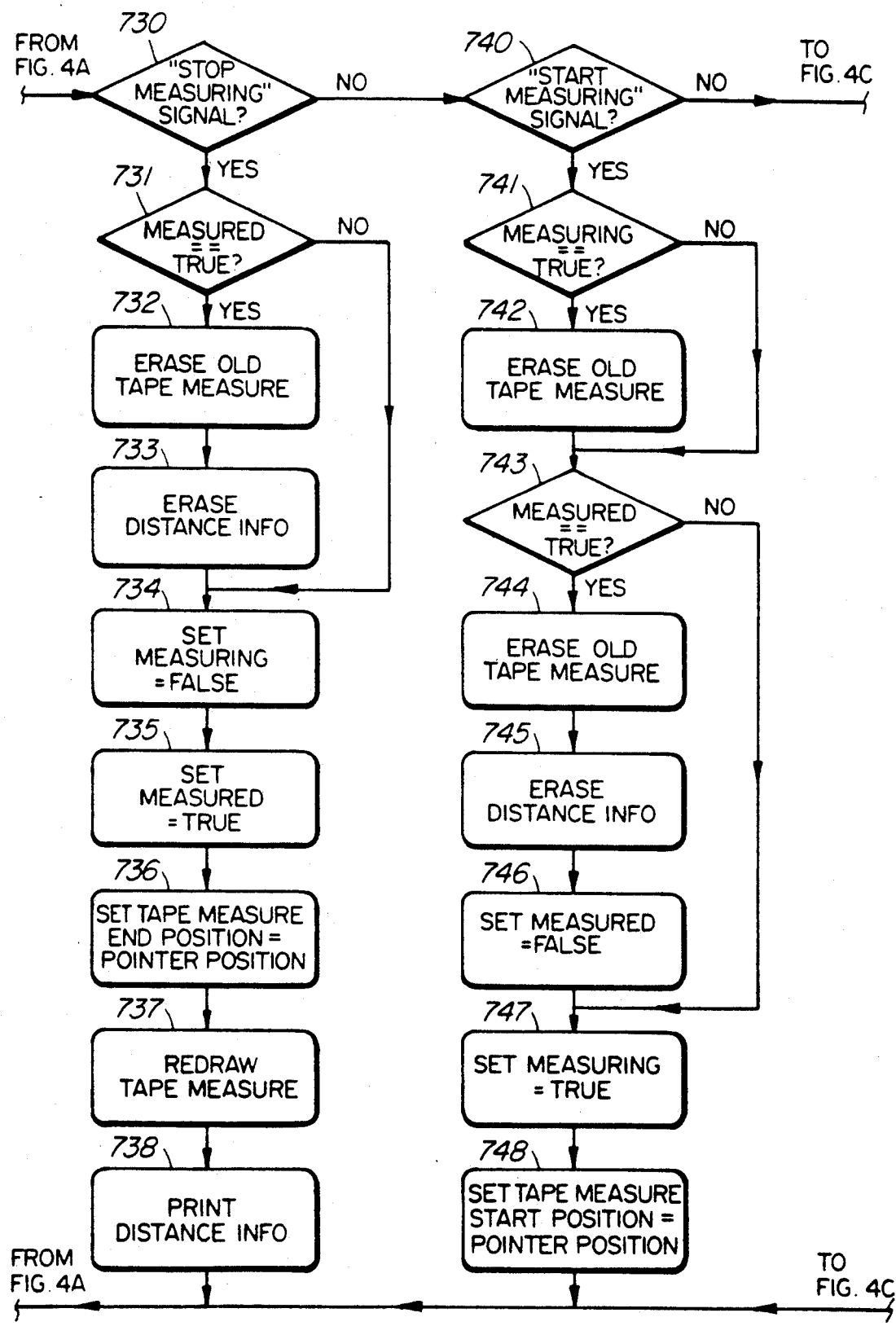
Figure 4C:
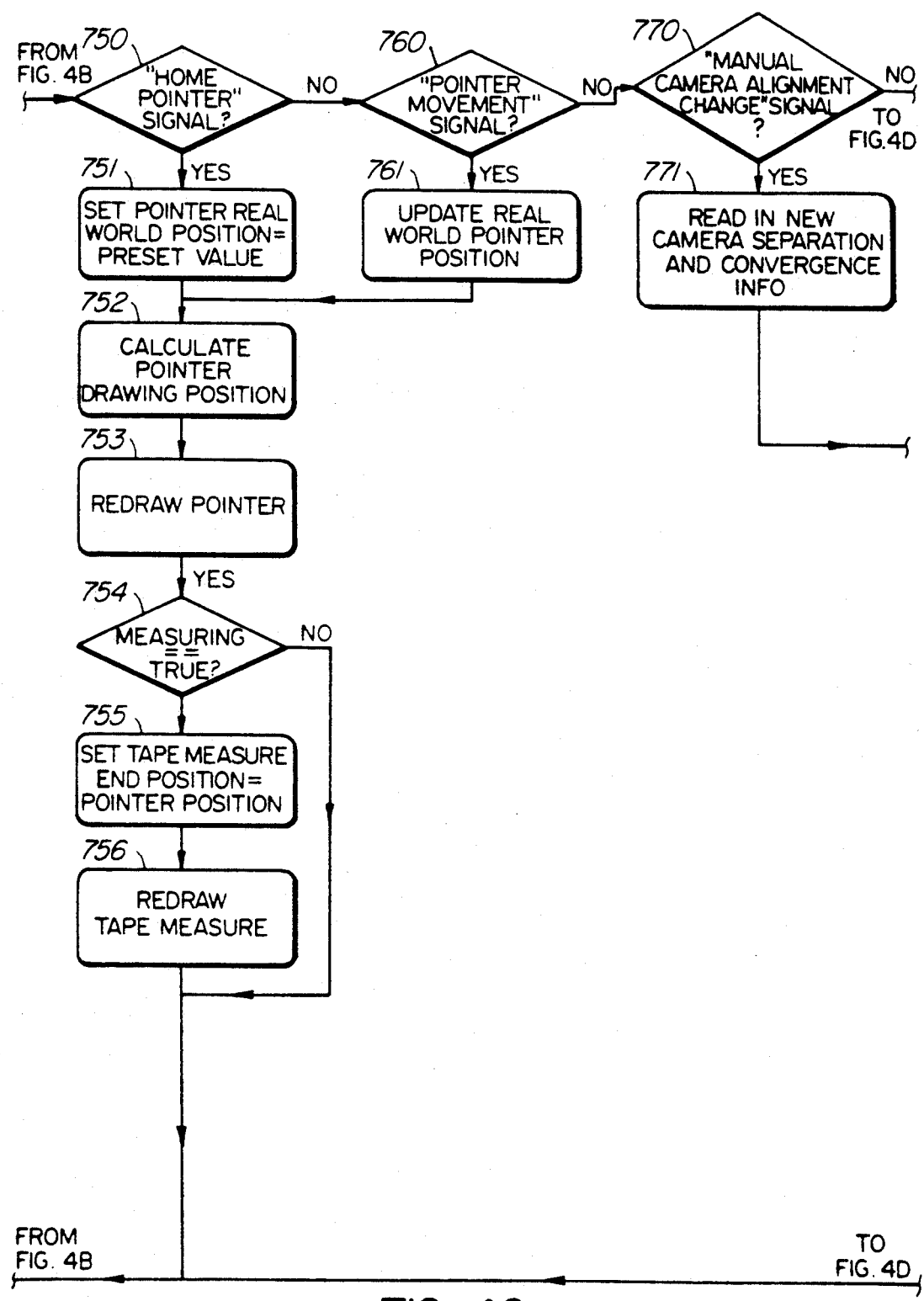
Figure 4D:
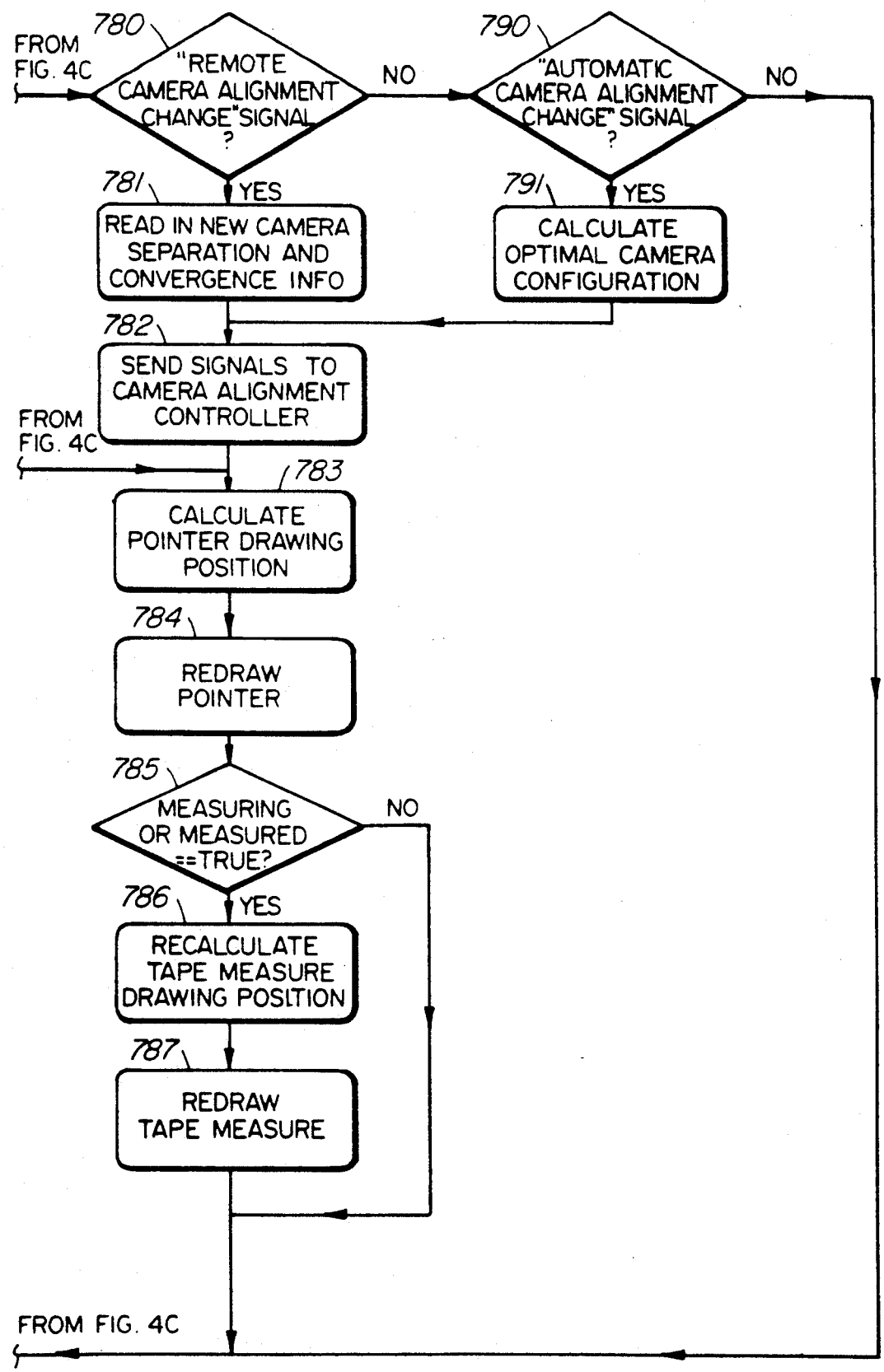

FIG. 3 illustrates a preferred form of alternating-field combining circuit 20 in which left video signal 15 is used to trigger sync separator 24, which in turn generates a square wave signal that drives a combining circuit 22, which includes left solid state relay 25 and right solid state relay 27. Sync separator 24 is well known to those skilled in the art, an embodiment of which is disclosed in an article by L.-Y. Lin, published in Electrical Design News, Oct. 16, 1986, pp. 233-234. A NOT gate 26 is inserted between the sync separator 24 and the right solid state relay 27 and causes the standard video signal 23 to be comprised of alternating odd and even fields supplied by the incoming left and right video signals 15 and 17, as illustrated in FIG. 2. With no loss of generality it is understood that sync separator 24 shown in FIG. 3 could equally well have been triggered by right video signal 17, rather than left video signal 15 as shown.

Referring to FIG. 1, stereographic pointer image generator 30 will be seen to include a computer video sync circuit 31, a control computer 32, a video keying circuit 34 and a pointer positioning device 35. Pointer image generator 30 operates, by means of computer video sync circuit 31, upon incoming standard video signal 23 to synchronise or "genlock" the raster graphic output 33 of control computer 32 with video signal 23. As is well known to those skilled in the art, "genlocking" is the forced synchronization, by an external signal, of the internal horizontal, vertical and colour burst oscillators of a video device. Raster graphic output 33 is of the same electronic format as conventional analogue video signals, such as NTSC, PAL, SECAM and the like. A video keying circuit 34 is operable to superimpose graphic output 33 upon the synchronised standard video signal 23, allowing the two video signals to be displayed together as a single combined video signal 36 on the same viewing screen 38. Circuits 31 and 34 are well known to those skilled in the art, one combined implementation of which is the AmiGen genlock device, manufactured by Mimetics Corporation of Palo Alto, Calif. Output 33 is a video signal of the stereographic pointer of the present invention.

Control computer 32 includes software, generally designated by reference numeral 70 in FIG. 4, for creating and displaying computer generated left and right images, such as a computer generated cursor, or crosshair, or orthogonal axis system, or cursor attached to a "rubber band" anchored at its other end, or a "tape measure" running between two movable ends, under the control of a human operator, and for displaying these in synchrony with the left and right camera video images on the same viewing screen 38 thereby creating a virtual, stereographic pointer which appears to be superimposed upon the observed "real" three dimensional video image produced by the camera system.

Pointer positioning means 35 is in the form of a joystick, trackball, mouse or the like and enables a human operator to communicate with the computer in order to manipulate, with three degrees of freedom, the perceived location of the stereographic pointer within the perceived three dimensional real video image. Three degree of freedom positioning devices are well known in the art and are generally comprised of a stick or handle or trackball which can move within a two-dimensional plane and an additional control mechanism which allows movement in a third orthogonal dimension. Sensors (not shown) associated with movement of the pointing device generate signals which are transmitted to the Control Computer 32. One embodiment of such a device is the FastTRAP three axis pointing device manufactured by MicroSpeed, Inc. of Fremont, Calif., comprising a two degree of freedom (x-y plane) trackball and a one degree of freedom (z plane) thumbwheel. The device include buttons which can be used to cause the control computer to fix one or more pointers in a particular position and draw trajectories between them as indicated earlier with reference to FIGS. 7 and 8.

Spectacle synchronisation and driving circuit 60 acts upon composite interlaced standard video signal 36, which consists of the real three dimensional video images produced by the cameras and the superimposed stereographic pointer, as displayed on video screen 38, by identifying the odd and even raster fields, corresponding to left and right eye images respectively (or, equivalently, right and left eye images respectively), by means of sync separator 61. Sync separator 61 is well known to those skilled in the art, and one embodiment is known from the article by L.-Y.Lin, published in Electrical Design News, Oct. 16, 1986, pp. 233-234. The output of sync separator 61 is fed to spectacle driver 62, which produces driving signals fed in counterphase to stereoscopic shuttering spectacles 64, according to the principles illustrated in FIG. 2. Stereoscopic shuttering spectacles 64 are operable to separate, for the observer, the odd and even field video images being displayed on the video screen 38 into left and right eye images, respectively, to thereby allow the observer to perceive three dimensional images on the display screen.

Steroscopic shuttering spectacles 64 are well known in the art and are characterised as portable electro-optic shutter viewers having electro-optic shutters for positioning proximate to the eyes of the user. The preferred embodiment of stereoscopic shuttering spectacles 64, as well as necessary means for implementing spectacle driver 62, are known from Paul Milgram U.S. Pat. No. 4,698,668 issued Oct. 6, 1987. The combination of stereoscopic shuttering spectacles 64 and spectacle driver 62 include means (not shown) to receive a synchronisation signal and to alternatively activate and deactivate individual shutter lenses (not shown) opposite the left and right eyes of the viewer to observe the even field scan and the odd field scan as transmitted in the composite video signal delivered to video screen 38.

Figure 6:
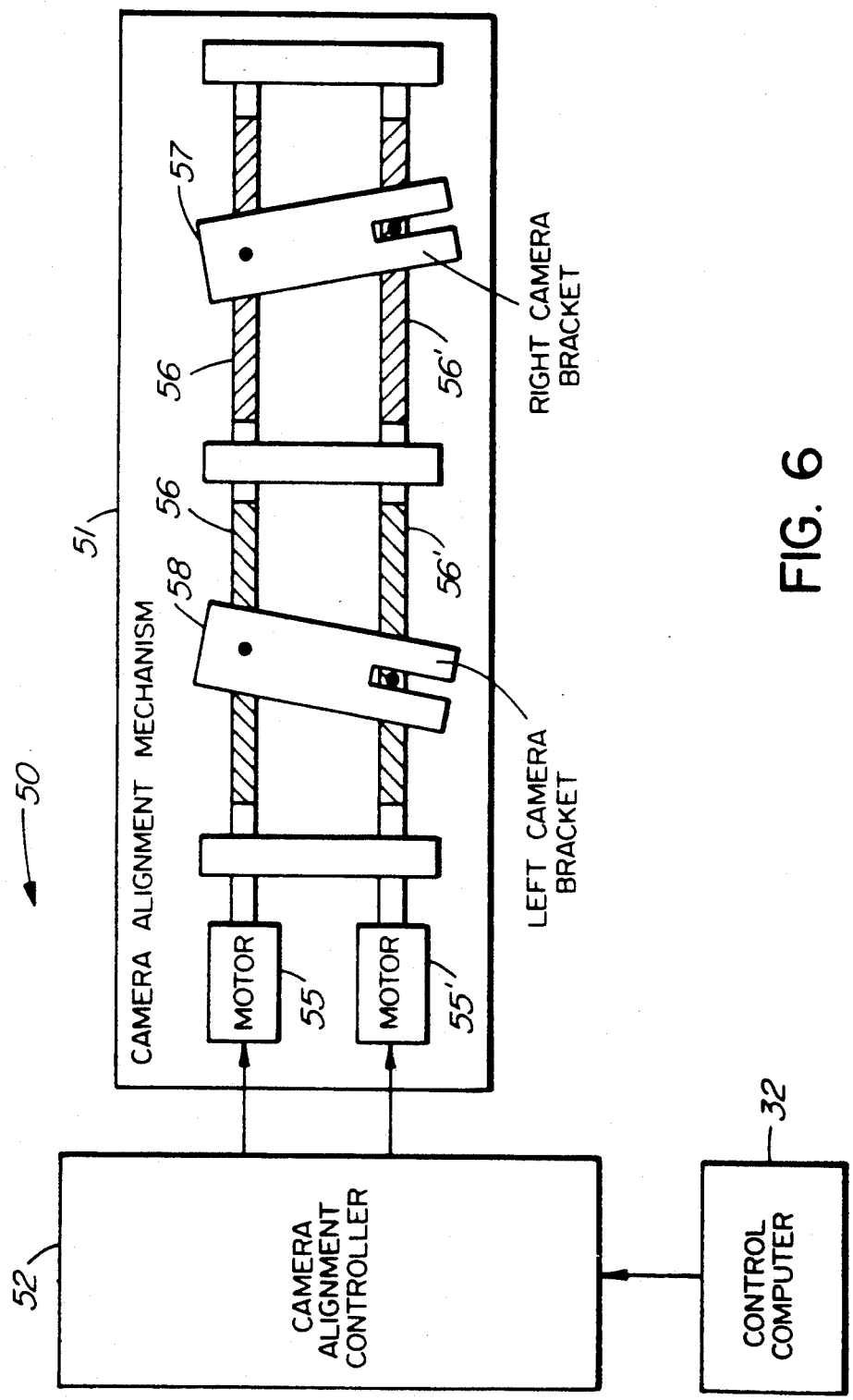
FIG. 6 is a schematic diagram of a preferred embodiment of a dual camera alignment control system according to the present invention.

In addition to generating the raster graphic output 33 required for the stereographic pointer, control computer 32 provides signals to control the alignment of the dual video cameras comprised within the synchronised dual video signal generating system 12, as illustrated within FIG. 6. Signals to control the alignment of the dual video cameras are optionally generated by software within control computer 32, in response to equivalent spatial location of the stereographic pointer and/or requests by the human operator. In this embodiment, signals arising from the control computer 32 are fed to the camera alignment controller 52 which in turn activates motors 55 and 55' comprised within the camera alignment mechanism 51. The preferred embodiment of the camera alignment mechanism 51, as illustrated schematically in FIG. 6, comprises a pair of mounting brackets, the left camera bracket 57, upon which left camera 14 is mounted, and right camera bracket 58, upon which right camera 16 is mounted. The motors 55 and 55' act to turn the two roman screws 56 and 56', each of which have both left and right hand threads, thereby moving the connection points of the two camera brackets 57 and 58 on roman screws 56 and 56' to different positions on the screws, thereby changing the orientation of the camera brackets 57 and 58 relative to each other. By turning both screws appropriately, the two platforms move together and apart symetrically, which allows for adjustment of camera separation. By turning only one screw, or by turning both screws in opposite directions, the angle of convergence, or divergence, of the two cameras can be adjusted. Combining both of these modes of adjustment therefore allows independent adjustment of camera separation and camera convergence angle.

In order to generate a stereoscopic graphic image of a pointer or any other two or three dimensional object so that it appears to the User in a specific location in space, it is necessary to determine the precise locations on the viewing monitor 38 where the corresponding left-eye and right-eye images would appear if the pointer or object were physically present in the view of the stereoscopic video scene.

Figure 5A:
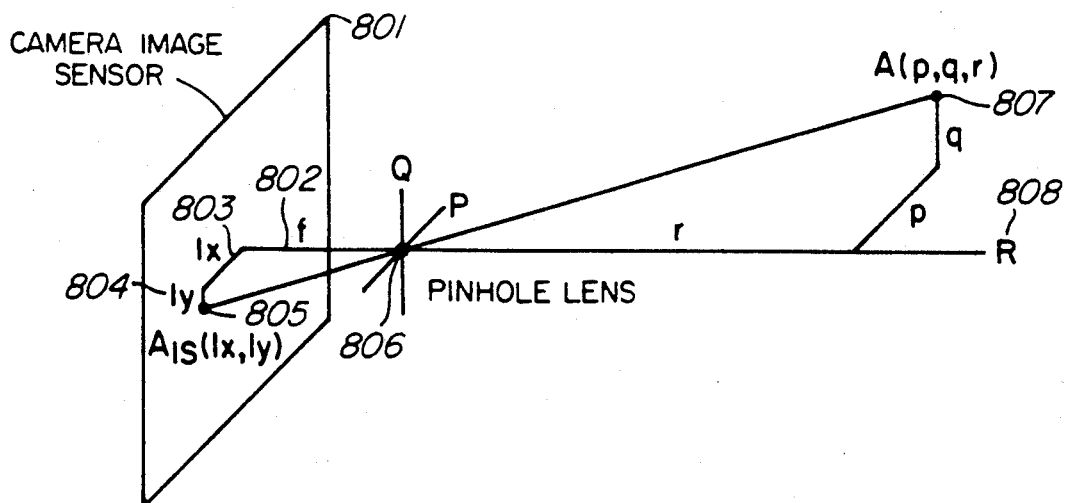
FIGS. 5a and 5b are schematic representations of a preferred embodiment of stereographic pointer plotting geometry according to the present invention.

FIG. 5a represents the geometry of the left camera, where the compound lens of the camera is represented as a pinhole lens 806. The three dimensional geometrical basis of the camera system PQR has its origin corresponding with the location of the pinhole lens 806. The R axis 808 is perpendicular to the camera image sensor 801 and passes through the centre of it. Given an arbitary point expressed in terms of the PQR basis, such as A(p,q,r) 807, it is possible to calculate the position of the image $A_{IS}(lx,ly)$ 805 on the image sensor 801, with the equations $lx=f(p/r)$ and $ly=f(q/r)$, where lx 803 is the horizontal distance of the image $A_{IS}(lx,ly)$ from the centre of the image sensor 801, ly 804 is the vertical distance of the image $A_{IS}(lx,ly)$ from the centre of the image sensor 801, and "f" is the focal length of the lens.

Figure 5B:
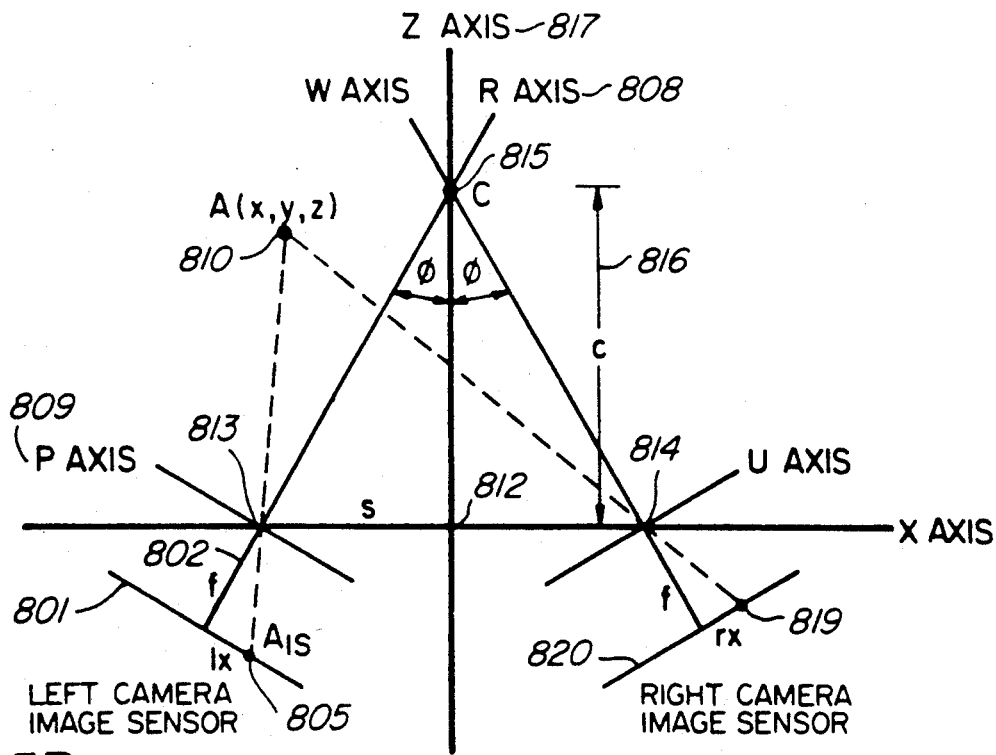

A top view of a simplified two camera stereoscopic system is shown in FIG. 5b. The centroid 812 of the XYZ basis of the stereoscopic system is located midway between the left camera lens 813 and the right camera lens 814, at a distance "s". The two cameras converge on point "C", situated a distance "c" from the centroid 812 along the Z axis. The convergence angle $\phi$ is defined by the equation $\tan(\phi)=s/c$. Note that for stereoscopic camera configurations that are parallel, c is defined as infinite and $\phi$ is defined as zero.

The geometric basis of the left camera is denoted by the PQR axes in FIG. 5a and by the PR axes in FIG. 5b, while the geometric basis of the right camera is denoted by the UVW axes, shown as the UW axes in FIG. 5b. Any point expressed in terms of any one of the three bases (XYZ, PQR, UVW), can also be expressed in terms of any of the other bases. For example, given any point A, expressed in terms of the XYZ basis, as in FIG. 5b, its representation in the other bases is calculated as follows. Given f, s, and either c or $\phi$, and given:

$$[A] = \begin{bmatrix} x \\ y \\ z \end{bmatrix}$$

then one can calculate:

$$[A]_{PQR} = \begin{bmatrix} p \\ q \\ r \end{bmatrix} \begin{bmatrix} \cos(\phi) & 0 & -\sin(\phi) \\ 0 & 1 & 0 \\ \sin(\phi) & 0 & \cos(\phi) \end{bmatrix} \left( \begin{bmatrix} x \\ y \\ z \end{bmatrix} - \begin{bmatrix} s \\ 0 \\ 0 \end{bmatrix} \right)$$

Similarly, $$[A]_{UVW} = \begin{bmatrix} u \\ v \\ w \end{bmatrix} \begin{bmatrix} \cos(\phi) & 0 & \sin(\phi) \\ 0 & 1 & 0 \\ -\sin(\phi) & 0 & \cos(\phi) \end{bmatrix} \left( \begin{bmatrix} x \\ y \\ z \end{bmatrix} - \begin{bmatrix} -s \\ 0 \\ 0 \end{bmatrix} \right)$$

When the location of any point A expressed in the basis of each camera as $[A]_{PQR}$ and $[A]_{UVW}$, one can calculate the location of the image 805 on the left camera image sensor 801 and the image 819 on the right camera image sensor 820 using the method outlined below: For the left camera:

$$lx = f\frac{p}{r} \text{ and } ly = f\frac{q}{r}$$

For the right camera:

$$rx = f\frac{u}{w} \text{ and } ry = f\frac{v}{w}$$

The relationship between the location of $A_{IS}$ on a camera image sensor and the corresponding location on the display screen is linear in both the horizontal and vertical directions for an ideal display system. For real display systems, appropriate calibration algorithms must be implemented to account for non-linearities in each direction. Ideally, the gain in each direction is the same, although this is a function of the settings of the monitor. In order to draw a realistic virtual image that will have the correct size and apparent location in depth, the left and right eye images are drawn on the viewing screen with the size and location they would have if they were real. The method described above allows this to be done accurately.

The preferred embodiment of software logic 70 for generating interactive pointer images, under control of user through pointer positioning device 35 is illustrated in FIG. 4. In the embodiment shown, software logic 70 serves to enable the generation of pointer images which take on arbitrary forms, such as "V" shaped cursor, crosshair, orthogonal axis system, or cursor attached to a "rubber band" anchored at its other end, or "tape measure" function comprising "rubber band" anchored under interactive control of the software user at both ends. In addition, ordinary alphanumeric text can be generated to to appear at specified apparent depth planes. In the description which follows, the term event means signals and commands generated by the software User, the term TapeMeasure means a stereographic line generator produced by the software and used by the user to measure real world distance specified points in external video view, the term "Measuring" Flag indicates that TapeMeasure is currently employed and the term "Measured" Flag indicates that the TapeMeasure operation has completed, and a fixed line with distance information appears on the display.

According to software logic 70, generation of pointer images commences with invocation of stereographic pointer program 701, causing initialisation 702 of computer memory and hardware device. Upon invocation of Draw Pointer routine 703, Control Computer 32 enters the Wait for Event state 704.

Upon Event occurrence, the software first tests for a "Quit" Signal at 710. If present, the software tests at 711 for Measuring flag to be True, signalling that current measuring tape function is to cease. If True, the old TapeMeasure is erased (713), Measuring Flag is set to False (714), and the software returns to Wait for Event state 704. If False, the software routines are ShutDown at 712 and the software exits. If no "Quit" signal is present at 710, the software tests at 720 for "Change Pointer Shape" signal to be present.

If a "Change Pointer Shape" signal is present, the software sets the Pointer Shape to NewShape at 721, redraws the Pointer at 722, and returns to Wait for Event 704. If no "Change Pointer Shape" signal is present at 720, the software tests for "StopMeasuring" Signal 730. If it is present, the software tests if Measured flag is True at 731. If True, the software erases the old TapeMeasure at 732 and erases the Distance Information at 733. This is in order to clear the screen if the StopMeasuring signal arrives without a preceding StartMeasuring signal. If Measured flag is False at step 731, then steps 732 and 733 are skipped. The software then sets Measuring flag to False at 734 and Measured flag to True at 735. The software then sets TapeMeasure EndPosition to current the Pointer Position at 736, redraws TapeMeasure at 737, prints Distance Information 738, and returns to Wait for Event state 704. If no "StopMeasuring" signal is present at 730, the software tests for "StartMeasuring" signal 740, which indicates that the user wishes to start measuring from a new location. If this signal is present, the software tests whether the Measuring flag is True at 741. If True, the software erases the old TapeMeasure at 742 while if Measuring flag is False, step 742 is skipped. The software then tests if Measured flag is True at 743. If True, the software erases Old TapeMeasure 744, erases Distance Information 745, and sets Measured flag to False 746. If Measured flag is false at 743, steps 744, 745 and 746 are skipped. The software then sets Measuring flag to True at 747 and TapeMeasure StartPosition to the current Pointer Position 748. The software then returns to Wait for Event state 704.

If no "StartMeasuring" signal is present at 740, the software tests at 750 if "HomePointer" signal is present. This indicates a desire to return the pointer to a predefined location. If present, the software sets at step 751 the Pointer to Real World Position equal to Preset Value, calculates Pointer Drawing Position at 752, and redraws Pointer at 753. If Measuring flag is True at 754, the software sets TapeMeasure EndPosition to Pointer Position 755, redraws TapeMeasure 756, and then returns to Wait for Event state 704. If Measuring flag is False at 754, the software returns directly to Wait for Event state 704.

If no "HomePointer" signal is present at 750, the software tests whether a "Pointer Positioning Device Movement" signal is present at 760. If present, the software updates Pointer Real World Position at 761, and continues from step 752 above.

If no "Pointer Positioning Device Movement" signal is present at 760, the software tests at step 770 whether a "Manual Camera Alignment Change" signal is present, indicating that the camera position has been adjusted manually, outside of program control. If present, the software reads in new values for Camera Separation and Convergence Point 771, and continues from 783 below.

If no "Manual Camera Alignment Change" signal is present at 770, the software tests if "Remote Camera Alignment Change" signal is present at 780. If present, the software Reads in New Camera Separation and Convergence information at 781. The software then sends appropriate control signals to Camera Alignment Controller 52 at step 782 to adjust the cameras remotely. The software then calculates new Pointer Drawing Position at step 783 and redraws Pointer at step 784 to maintain apparent real world position. If either Measuring flag or Measured flag is True at step 785 the software Recalculates TapeMeasure Drawing Position at 786 to maintain correspondence with real world view, redraws TapeMeasure at 787, and returns to Wait for Event state at 704. If both Measuring flag and Measured flag are True at 785, the software returns directly to Wait for Event state at 704.

If no "Remote Camera Alignment Change" signal is present at 780, software tests if "Automatic Camera Alignment Change" signal is present at step 790. If present, software Calculates Optimal Camera Configuration to minimize z-axis scale distortion based on current Pointer position and continues from step 782 above. If no "Automatic Camera Alignment Changes" signal is present at 790, the software ignores the Event and returns to Wait for Event state 704.

INTERACTIVE CAMERA ALIGNMENT

One of the problems associated with assembling a functional stereoscopic video system is determining suitable values for the separation and directional parameters of the cameras of the stereoscopic video system. Because the objective of a stereoscopic video system is to allow an observer to perceive volumetric information about an object by means of binocular disparity, that is, by means of the differences between the projections of the parts of an object onto the two retinas of the observer's eyes, it is generally desirable that the images produced by the cameras be oriented with respect to each other such that the disparity between the corresponding retinal images does not exceed the limits of the observer's ability to fuse those separate images into a single stereoscopically perceived image.

Keeping in mind that the separation between a human's two eyes is fixed, the objective of matching the orientation of the cameras with the orientation of the observer's eyes involves ensuring that the separation and the angle of convergence of the two cameras are appropriate relative to the separation and the angle of convergence of the observer's eyes. For any particular angle of convergence and particular horizontal separation between cameras, there will be one vertical line in space at which the vertical planes defined by the lines of sight of the two cameras intersect. Any object or object segment located along that line in space will be presented to the observer on the display surface as two concident images, that is, with no horizontal disparity, and will elicit a particular angle of convergence of the observer's eyes when observing it. The actual angle of convergence of the observer's eyes will depend on the separation between the observer's eyes and on the distance at which the observer's eyes are situated from the display surface.

Any object or object segment located at a point in space which is in front of the vertical line of convergence of the cameras, that is, proximal to the cameras, will produce left and right images on the display surface that have a certain disparity. When viewing such a point, the observer's eyes will converge at a point in front of the display surface, and the points will thus appear to lie in front of the display surface. The actual angle of convergence of the observer's eyes will depend on the separation between the observer's eyes, the distance at which the observer's eyes are situated from the display surface, the focal length of the lenses used and the gain of the displays. The term "display gain" is used here to refer to the relationship between the displacement of a point on the display screen, or display surface, relative to its corresponding displacement on the sensing element of the video cameras.

Any object or object segment located at a point in space which is behind the vertical line of convergence of the cameras, that is, distal to the cameras, will produce left and right images on the display surface that also have a certain disparity. When viewing such a point, the observer's eyes will converge at a point behind the display surface, and the point will thus appear to lie behind the display surface. The actual angle of convergence of the observer's eyes will depend on the separation between the observer's eyes, the distance at which the observer's eyes are situated from the display surface, the focal length of the lenses used and the gain of the displays.

Whenever the separation and angle of convergence of the video cameras, the focal length of the cameras, the gain of the displays and the distance of the observer from the display surface are such that the images presented to and perceived stereoscopically by the observer are similar to what would be perceived if the observer were to view the scene naturally with his own eyes, the stereoscopic display system can be thought of as orthostereoscopic. However, it is also possible to separate the cameras at smaller distances relative to the convergence angle, to produce a hypostereoscopic display system, or to increase the camera separation relative to the convergence angle to produce a hyperstereoscopic display system. With hyperstereoscopic display systems, the increased disparity between the left and right eye images results in an effective increase in the observer's ability to perceive differences in the location of points along the longitudinal axis of the camera system, that is, increased depth resolution. With hypostereoscopic display systems, the observer does not have to converge his eyes as much, for a given angle of convergence of the cameras to view particular objects, and, although depth resolution is decreased, the range within which the observer is able to fuse images will be correspondingly increased.

On the basis of these principles, at least six problem areas associated with determining the separation and alignment of stereoscopic video cameras, or optical elements, can be identified:

In order to perceive stereoscopically a "near object", that is, an object which is located in front of the line of camera convergence, i.e. proximal to the cameras, the observer must converge his eyes to a point in front of the display surface, to fuse the binocularly disparate images into one perceptually integral three dimensional object. In other words, any point which is located directly in front of the line of camera convergence, for example, will appear to the left of the centre of the right camera and to the right of centre of the left camera, thereby forcing the observer to converge his eyes to a point in front of the display surface. For objects which are farther in front of the convergence line, i.e. closer to the cameras, the observer must converge his eyes more. At some point it will become too difficult for most observers to accomplish this fusion, and the integral image may break down and be perceived as two separate images. This problem is magnified for camera configurations in which the cameras are placed in parallel, in which case all images appear in front of the line of convergence, which is at infinity. Similarly, for "far objects", that is, objects which are behind the line of camera convergence, i.e. distal to the cameras, the observer's eyes must diverge to a point behind the display surface, in order for a fused three dimensional image to be perceived. For objects which are farther behind the convergence line, i.e. farther from the cameras, the observer must converge his eyes less, and may even have to diverge his eyes. At some point it will become too difficult for most observers to accomplish this fusion, and the integral image may break down and be perceived as two separate images. One obvious practical solution to this problem is to endeavour to maintain the camera alignment such that the objects being viewed are as often as possible as close as possible to the line of convergence of the two cameras, thereby minimising the extent to which the observer is required to converge or diverge his eyes.

As an extension of the problem concerning the observer's need to converge or diverge his eyes excessively, in order to perceive an integral (i.e. fused) three dimensional object whenever such objects are respectively very far in front of or behind the line of convergence of the cameras, it may be possible in many cases for the observer to succeed in perceiving an integral fused image; however, it may be difficult for the observer to maintain that image for a long time without suffering from eyestrain and/or fatigue and/or discomfort. Once again, one obvious practical solution to the problem is to endeavour to maintain the camera alignment such that the objects being viewed are as often as possible as close as possible to the line of convergence of the two cameras. thereby minimising the extent to which the observer is required to converge or diverge his eyes, and might thereby potentially experience eyestrain and/or fatigue and/or discomfort.

Under normal binocular viewing, that is, without a stereoscopic video system. the focussing and convergence actions of a human's eyes are compatible, and in fact the human uses these as additional cues about the depth or distance of objects being viewed. That is, for objects which are relatively close to him, the human will both converge his eyes more and adjust his ocular focal length for close viewing. Conversely, for objects which are relatively far away, the human will both converge his eyes less and adjust his ocular focal length for far viewing. With a stereoscopic video system. on the other hand. a potential conflict between these cues may arise. That is, there is an intrinsic conflict between the observer's need to converge his eyes at different angles in order to perceive objects at different depths within the visual scene and the fact that all images are in fact being presented on one display surface. which is at a fixed distance from the observer's eyes. As a consequence. whereas the observer might continually be changing the angle of convergence of his eyes as he scans the visual scene presented on the display surface, the focal length of his visual system remains constant. Clearly this conflict is minimal whenever the objects being viewed lie in the vicinity of the line of convergence of the cameras, which corresponds to the objects being perceived as lying on the surface of the display. which is therefore compatible with the observer's own focal plane.

As is well known to those skilled in the art of producing stereoscopic display images, it is advisable to avoid presenting "near" objects, as defined above. in close proximity to the edges of the display screen. or display surface. This is because there can arise a serious conflict between the observed depth of the edges of the screen, which the observer clearly observes to be at the same depth as the rest of the screen surface, and the intended depth of the near object. Whenever the near object is not only in the vicinity of the screen edge, but goes partially beyond it, the edge of the screen will occlude parts of the near object. Because the observer's perceptual mechanisms know that objects can be visually occluded only by other objects which are in front of them, the near object stereoscopic cue will be overpowered by the occlusion cue, which will give the impression that the object is a far object instead. One solution to this problem is to endeavour to ensure that no near objects of interest are presented near the edges of the screen, and, if this case does arise, to redirect the cameras such that the objects of interest are displaced from the edges of the screen. This solution may not always be feasible, however, such as when the cameras are mounted on a stationary mount which cannot be moved, or which is not equipped with a panning capability. Another, more flexible. solution in such instances, which is offered by the present invention, is to realign the cameras and thereby redefine the depth of the observed environment relative to the viewing screen. such that the same objects. which should have been perceived as "near" objects. become perceived as lying at or "behind" the plane of the viewing screen.

Converged stereoscopic camera configurations can result in what is known as stereoscopic depth distortion. whereby the locations of objects in the real world which are located within a fronto-parallel plane defined by the alignment of the cameras will appear to be distorted to the observer by the stereoscopic video system. For camera configurations for which the camera separation is relatively large relative to the angle of convergence of the cameras, stereoscopic depth distortion will increase. For example. with widely converged cameras. an observer stereoscopically viewing a horizontal metre stick located in the fronto-parallel plane including the camera convergence point may report that the meter stick appears to be curved away from the observer. For a fixed camera configuration, the depth distortion phenomenon will be static. Whenever the camera system is moved in some way, involving translational and/or rotational motion, dynamic depth distortions will result. The various properties of the stereoscopic depth distortion phenomenon have been analysed and reported, for example, by D. B. Diner and M. von Sydow in NASA Jet Propulsion Laboratory Publication JPL 87-1, Rev. 1, May, 1988, "Stereo Depth Distortions in Teleoperation".

Any stereoscopic camera configuration will have associated with it a particular stereoscopic depth resolution, that is, the extent to which the stereoscopic cues supplied by the display system allows the observer to detect just noticeable differences in the location of points along the longitudinal axis of the camera system. With hyperstereoscopic display systems, that is, with relatively large camera separations relative to the angle of convergence of the cameras, stereoscopic depth resolution will be increased. Two problems are associated with the degree of stereoscopic depth resolution. One problem is that for hyperstereoscopic display systems, stereoscopic depth distortion will also increase, which implies that stereoscopic depth resolution and stereoscopic depth distortion must always be traded off against each other in the design of a stereoscopic display system. Another problem is the so-called cardboarding effect, according to which an object will appear to be flattened in the z direction, that is, the direction of the longitudinal axis of the camera system. This will occur with hypostereoscopic display systems, whenever the display gain in the z-direction is less than the display gain in the x-y plane, that is, within the fronto-parallel plane which is orthogonal to the z-axis.

From this discussion it is clear that, under many circumstances, it is advantageous to have the cameras arranged, in terms of direction, separation, and angle of convergence, such that the centre of the observer's interest within the video scene being viewed is as close as possible to the point of convergence of the cameras. If this can be achieved, the problems of excessive convergence or divergence of the observer's eyes, eyestrain, fatigue and discomfort, as well as stereoscopic depth distortion, can be minimised, and stereoscopic depth resolution can be increased in conjunction. In other words, in many instances there is some optimal camera arrangement, in terms of direction, separation, and angle of convergence of the cameras, relative to the vicinity in the video scene within which the observer happens to be looking, or concentrating his attention.

To determine this optimum, however, it is necessary to know where this region is within the video scene.

If that region is fairly static, then an appropriate camera configuration can be determined and fixed. If the observer is required to scan the scene extensively, however, and/or if the cameras are to be redirected dynamically within the video scene, then a fixed camera configuration will not, in the general case, be optimal. It is advantageous, in other words, to be able to reconfigure the cameras dynamically during a particular viewing operation, and thereby optimise the viewing operation.

A number of methods of reconfiguring the stereoscopic cameras dynamically during a viewing operation are possible. The viewer may interactively adjust the cameras until a subjectively acceptable image is obtained. Alternatively, analytical methods can be used to determine an optimal camera configuration, with respect to the properties of the stereoscopic video system, to the task to be accomplished, and to the viewing region within the video scene.

In all cases of determining the optimal camera configuration, it is necessary to know the object of the viewing operation, which is a function of the region in space that is the centre of the observer's visual attention. Clearly, the human observer himself will know that point or region at any point in time. However, for dynamic camera configuration control, the problem remains of how to communicate information about that point or region to the system component whose role it is to compute the optimal configuration. In terms of the x-y plane, that is, in terms of any of the fronto-parallel planes which are orthogonal to the longitudinal axis of symmetry of the two cameras, this information is straightforward to communicate. Simply by panning, tilting, sweeping or translating the cameras, the observer may be able to indicate the new centre of attention. Alternatively, the observer may use a set of cross-hairs, or similar indicator, overlaid on the screen to indicate where in the x-y plane the cameras should be directed. On the other hand, in the z-direction, that is, in the direction along the longitudinal axis of symmetry of the camera system, it is more difficult for the observer to indicate his focus of attention. With a stereoscopic video system the observer is able to perceive the region of interest; however, there is no obvious means of specifying the location of this region to the system component whose role it is to compute the optimal camera configuration. One of the principal objectives of the present invention is therefore to enable the observer to communicate, either overtly or covertly, the location of such points or regions of interest to the system component whose role it is to compute the optimal camera configuration, in order that the cameras remain optimally configured throughout any viewing operation.

The second main objective of the present invention is to enable the stereoscopic video system to be reconfigured easily, in response to (re)computation of the optimal camera configuration by the system component whose role it is to compute that configuration. In principle, the actual reconfiguring of the cameras can be carried out either under direct manual control, or under remote control, using some source of power to move the cameras relative to each other. Clearly, for situations in which the video cameras are physically remote from the observer, however, remote control is preferable. The present invention provides a motorised means of realising on-line adjustment of the camera separation and convergence angles, in order that the cameras remain optimally configured relative to the observer's focus of attention, or intended focus of attention, in the stereoscopic video scene.

It is important to point out that uses of the present invention are not limited to stereoscopic video systems only. Frequently in cinematography, video cameras are incorporated within or in conjunction with film cameras, as a means of obtaining immediate feedback on the scene being recorded, aiming the cameras, etc. In a stereoscopic cinematographic system, it is possible to extend this technique by employing stereoscopic video cameras. The present invention therefore provides a means for the operator of a stereoscopic cinematographic system to to communicate, either overtly or covertly, the location of such points or regions of interest to the system component whose role it is to compute the optimal camera configuration, in order that the cinematographic cameras remain optimally configured throughout any filming operation, as well as providing a motorised means of realising on-line adjustment of the cinematographic camera separation and convergence angles, in order that the cinematographic cameras remain optimally configured relative to the intended focus of attention within the stereoscopic video scene.

Figure 9:
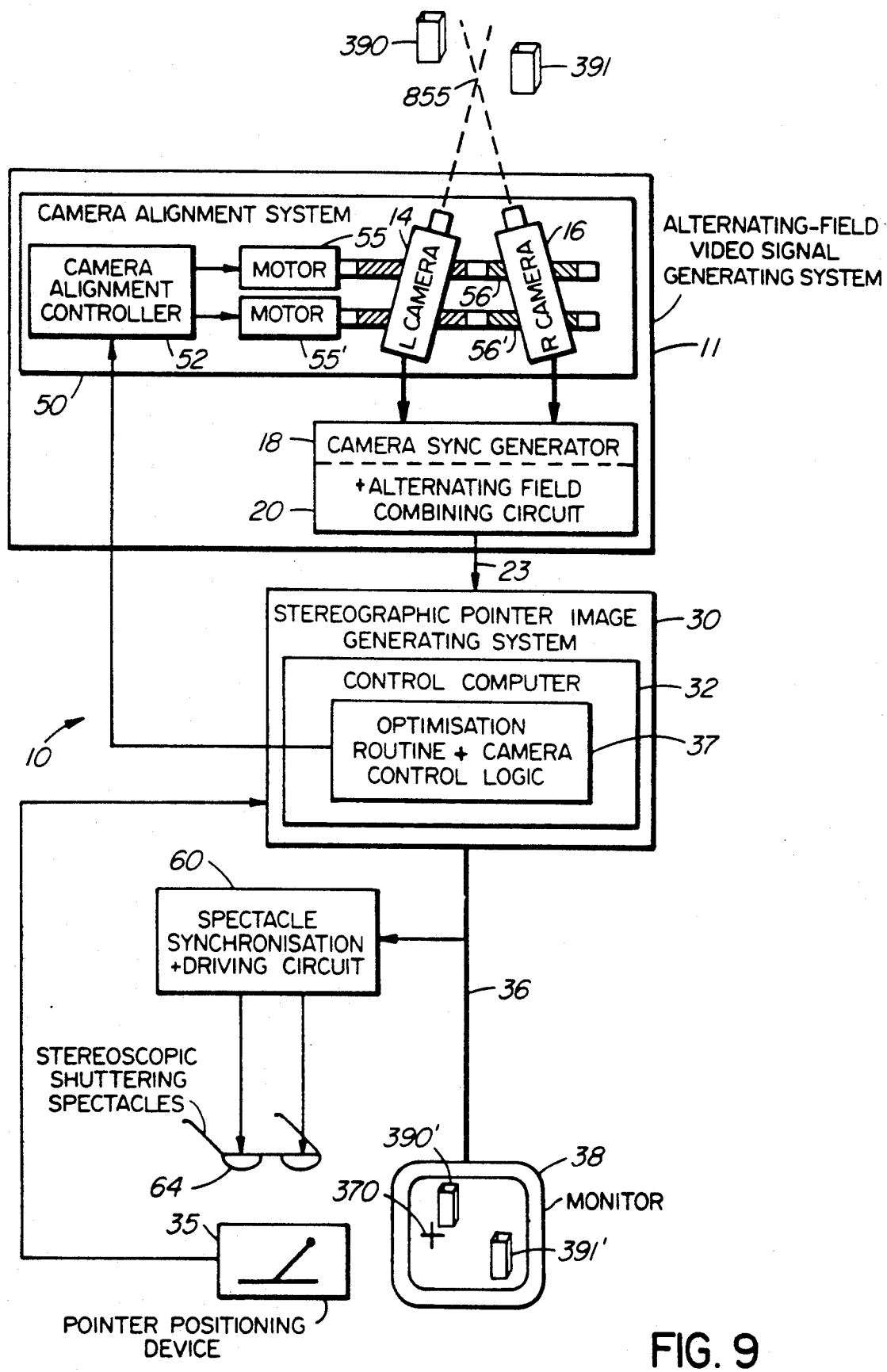
FIG. 9 illustrates an embodiment of the present invention, which provides for dynamic adjustment of the camera separation and camera angle of convergence.

FIG. 9 illustrates an embodiment of the present invention, which provides for dynamic adjustment of the camera separation 2s, and camera angle of convergence $2\phi$, as defined in FIG. 5B. In that figure, video cameras 14 and 16 are depicted schematically, from a simulated top view, as converging at point 855 in space in front of the cameras, in the vicinity of two real objects 390 and 391. The same two objects are shown reproduced in the video monitor 38, as objects 390' and 391'. As depicted in the figure, however, the observer has caused a virtual pointer 370, in the form of a pair of cross-hairs, to be drawn proximal to the observed location of object 390'. Note that the pointer image 370 does not appear in the real scene near object 390. According to the preferred embodiment, if the observer's focus of attention should deviate an excessive distance from point 855, for example as illustrated, the decision may be taken to realign the cameras, that is, to change the camera separation and camera angle of convergence to accommodate this shift of focus. The decision to effect this realignment may be taken by either the observer himself, or by rules which have been programmed within the control computer 32, in the Optimisation Routine + Camera Control Logic Subsystem 37. The actual reconfigured camera state, together with the commands to the Camera Alignment Controller 52 necessary to effect the changes, are computed by the Optimisation Routine + Camera Control Logic Subsystem 37, according to the methods illustrated in FIGS. 10 and 11.

The Optimisation Routine and Camera Control Logic Subsystem 37 computes the required configuration of the stereoscopic video system, that is, depending on the indicated region of interest, the routine computes the appropriate separation of the video cameras 2s and their angle of convergence $2\phi$. If the stereoscopic image generating system is equipped with a pan and/or tilt controller, or if it is equipped with remotely controlled zoom lenses and/or focus adjustments, these parameters too can be configured by the Optimisation Routine and Camera Control Logic Subsystem 37.

According to the present invention, three strategies are possible to govern realignment of the stereoscopic cameras, all of which are explained and illustrated in the following. According to one strategy, the user indicates, by means of the Pointer Positioning Device 35 and the stereographic pointer 370, the current point of interest and indicates a desire for either increased depth resolution or greater fusable stereoscopic range. Upon command of the user, the Optimisation Routine + Camera Control Logic Subsystem 37 will use its knowledge of the equivalent location of the pointer in real three dimensional video space to guide the aiming and the focus of the cameras. The Optimisation Routine + Camera Control Logic Subsystem 37 will also permit the user to indicate an appropriate trade-off between resolution and fusable range. Separate controls can be provided for remote operation of zoom lenses. According to another strategy, the Optimisation Routine + Camera Control Logic Subsystem 37 continuously tracks the stereographic pointer, automatically adjusting the stereoscopic camera configuration when appropriate, using the movement of the pointer as an indicator of the current focus of interest and necessary stereoscopic range. According to a third strategy, the user has complete manual control over the stereoscopic camera configuration.

Figure 10A:
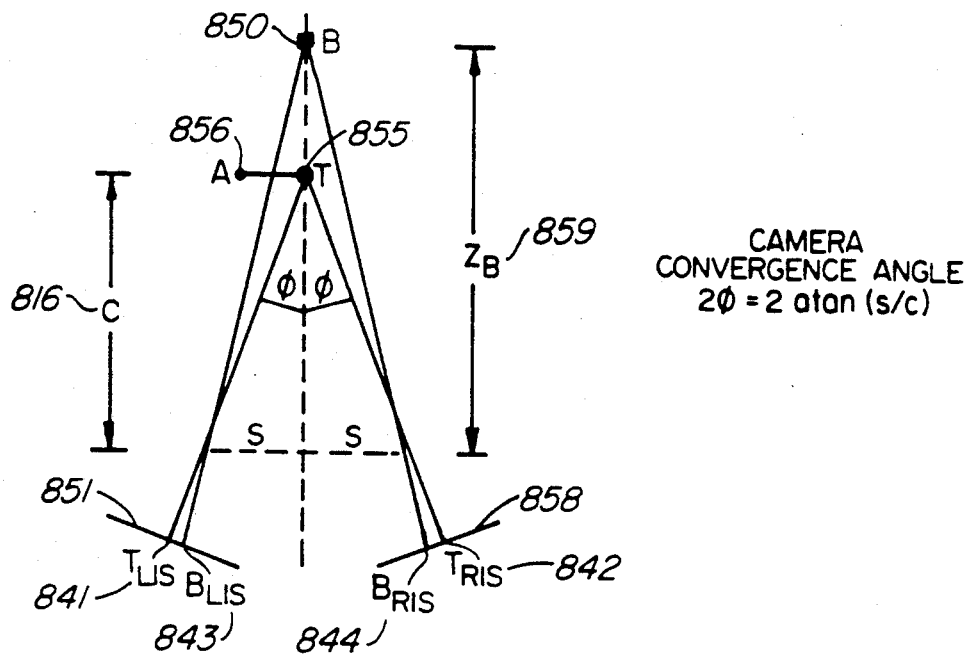
FIGS. 10a and 10b are diagrams illustrating the geometry of the optical sensing elements of cameras and the perception by a human observer of the corresponding stereoscopic images.
Figure 10B:
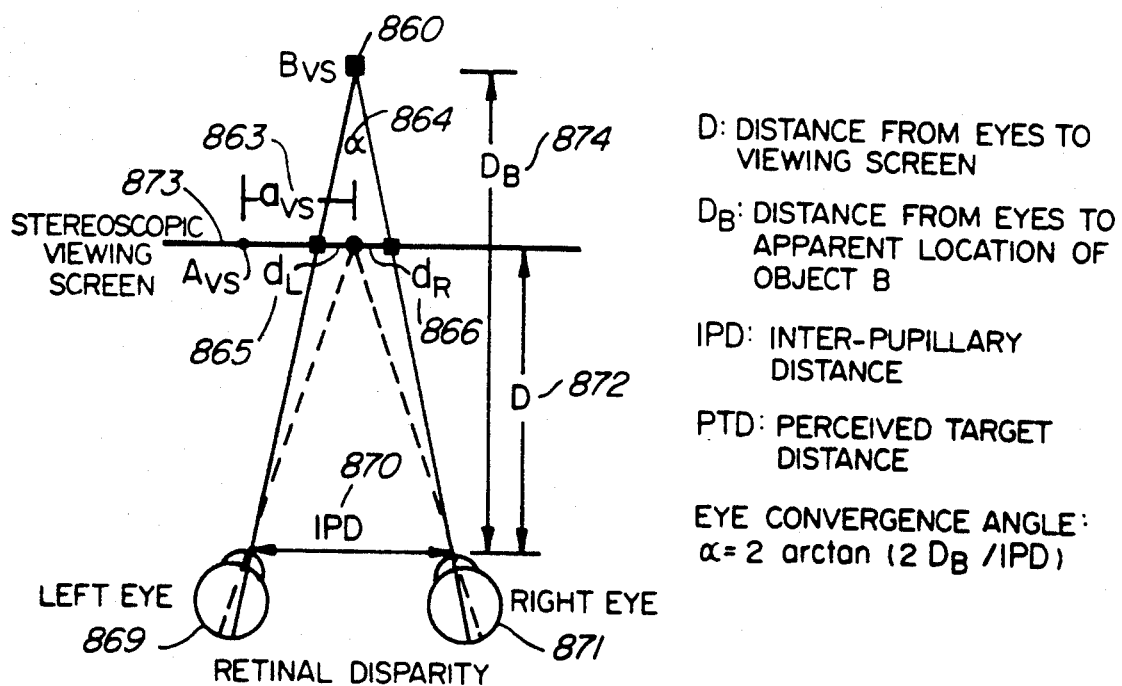
Figure 11A:
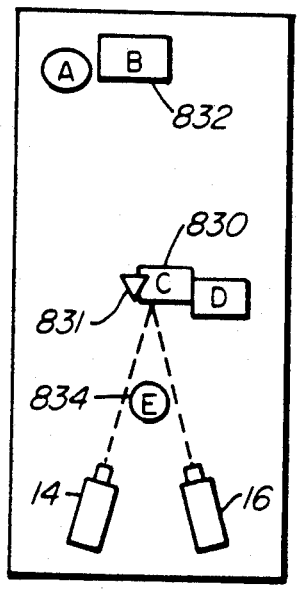
FIGS. 11a through 11e depict various top views of a stereoscopic viewing system in a hypothetical working environment to illustrate the manner in which one embodiment of the present invention operations to dynamically control the configuration of the stereoscopic cameras.
Figure 11B:
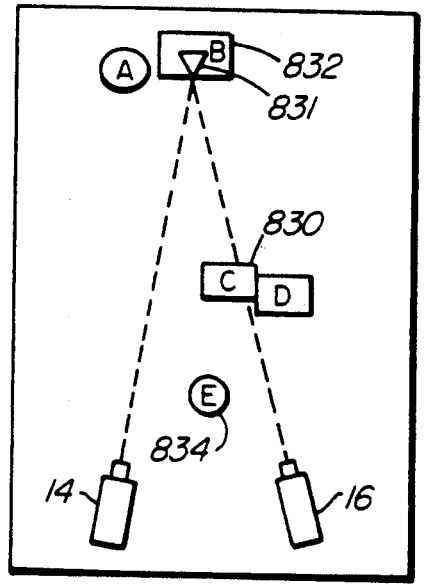
Figure 11C:
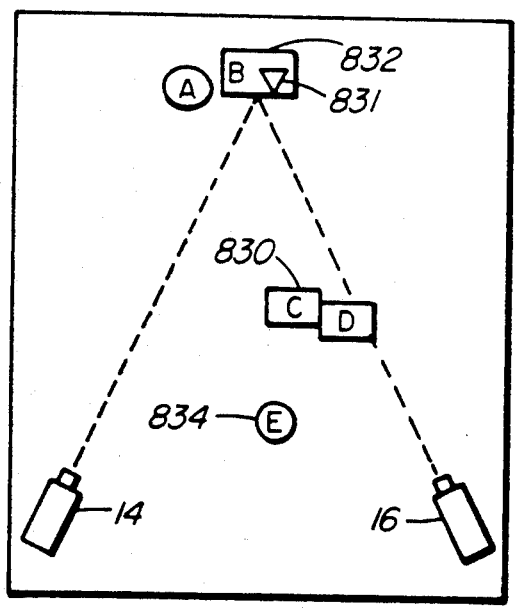
Figure 11D:
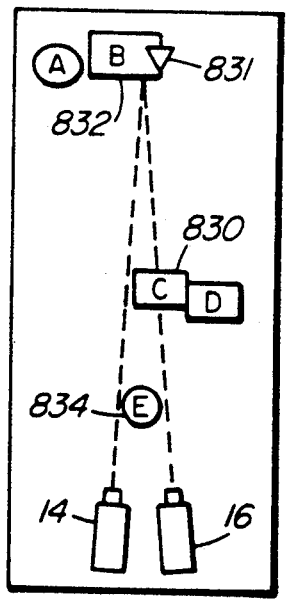
Figure 11E:
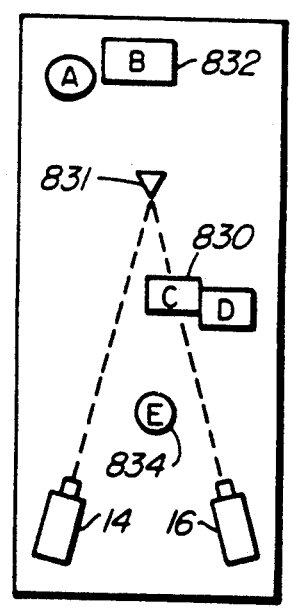

The Optimisation Routine + Camera Control Logic Subsystem 37 calculates the appropriate camera configuration based on the geometric model of human stereopsis illustrated in FIG. 10b. The model assumes that human eyes are limited in their range of acceptable convergence angles. In young adults, the eyes can converge comfortably from as close as 15 cm from the observer, at which point the angle of convergence $\alpha$ 865, that is, the angle formed at the convergence point by the intersection of the optical axes of the two eyes, is approximately 60 degrees, to as far away as optical infinity, in which case $\alpha$ 865 is 0 degrees. Under direct viewing conditions, that is, without the aid of any external viewing hardware, this range is sufficient to cover the entire visual range of distances from the observer.

Under stereoscopic video viewing conditions, the normal range of convergence angles may not suffice, however. Depending on the parameters which define the video system's optical sensing elements, fusion by the observer of some objects in the displayed image may require the observer to converge his eyes with a convergence angle which is greater than 60 degrees, or alternatively, in some cases, even to diverge his eyes. In cases for which divergence of the eyes occurs, the angle of convergence of the observer's eyes is negative, that is, the optical axes of the observer's eyes intersect behind the observer. This can occur with a hyperstereoscopic system for distal objects, when the disparity between left and right images is exaggerated.

The relationship between the geometry of the optical sensing elements of the real world cameras and the perception by a human observer of the corresponding stereoscopic image is illustrated in FIGS. 10a and 10b. If the two cameras are converging at Point T 855, then the positions upon the left and right image sensors 851 and 858 which correspond to any object located at Point T are both located at the centres of the respective image sensors (assuming ideal camera optics). In FIG. 10a these points are depicted as $T_{LIS}$ 841 and $T_{RIS}$ 842 respectively. On the other hand, the images of any other Point B 850 along the axis of symmetry of the cameras will be displaced from the centres of the left and right optical sensing elements. In FIG. 10a these points are depicted as $B_{LIS}$ 843 and $B_{RIS}$ 844 respectively. On the left sensor 851, the point $B_{LIS}$ 843 is displaced to the right of $T_{LIS}$ 841, by an amount that can be calculated by the equations given in the discussion of FIG. 5. On the right image sensor 858, the image of Point B 850 is displaced to the left of $T_{RIS}$ 842.

The image received by each optical sensing element through its lens must be scaled to fit the particular Stereoscopic Viewing Screen 873. In the simplest case, the displacement of each image point from the centre or origin of the display screen is scaled relative to the center or origin of the image sensors by some gain value G, where G can be defined, for ideal monitors and ideal identical cameras, as:

$$G = \frac{\text{viewing screen width}}{\text{image sensor width}}$$

For video systems that are not ideal, on the other hand, suitable two dimensional filtering or optical correction or calibration techniques, known to those skilled in the art, can be employed, such that G, rather than having a constant value for all points on the screen, becomes a function of the horizontal and vertical displacement of each point from the centre or origin of each image sensor.

Instead of the point T 855 lying at the point of convergence of the two cameras, consider now an arbitrary point A 856 adjacent to point T 855. Such a point could be considered, for example, as the end point of a real line with width a. In FIG. 5a the general case for the computation of the displacement $A_{IS}(lx,ly)$ 805 of an arbitrary point $A(p,q,r)$ 807 from the centre of a camera image sensor is illustrated. In FIG. 10a, the image of a line with width a would have a corresponding width of $a_{LIS} = f(a/r)$ on the left image sensor, where f 802 and r are as shown in FIG. 5a. The total width of the left image of such a line would therefore have some corresponding width on the stereoscopic viewing screen 873. This width is labelled $a_{1'S}$ 863 in FIG. 10b, and is defined by $a_{1's} = G\, a_{LIS}$. The visual angle subtended by the image of the line width $a_{1'S}$ 863 is a function of the distance D 872 of the viewer from the viewing screen 873. (Similar calculations apply for the width of the right eye image on the viewing screen and the visual angle subtended.)

The left and right eye images of point T are coincident on the viewing screen because point T is at the convergence point of the cameras. The images of point B are not, however. Referring to the computation of the distance lx 803 shown in FIG. 5a, in FIG. 10a the image of point B 850 on the left camera image sensor 851, $B_{LIS}$ 843, is some distance lx from the centre of the left sensor, while the corresponding image $B_{RIS}$ is some distance rx from the centre of the right sensor. The distances lx and rx correspond to distances $d_L$ 865 and $d_R$ 866 on the viewing screen, and are related (for ideal video cameras and viewing screens) by the equations $d_L = G$ lx and $d_R = G$ rx. For convenience, positive values are defined here as indicated in the figure; that is, $d_L$ 865 is positive to the left and $d_R$ 866 is positive to the right of the point of convergence. (For non-ideal systems, G is a function of the horizontal and vertical position of the image on the camera image sensor.)

The convergence distance $D_B$ 874 from the eyes of the observer to the stereoscopic image on the viewing screen of the real point B, which is shown as equivalent point $B_{1'S}$ 860 in FIG. 10b, can be calculated from the relationship $$D_B = \frac{D_{IPD}}{IPD - (d_L - d_R)}$$

where D 872 is the distance from the eyes 869 and 871 of the observer to the viewing screen 873, IPD 870 is the inter-pupillary distance of the observer, and $d_L$ 865 and $d_R$ 866 are as defined above. This equation can be used to calculate the apparent distance to any such stereoscopically displayed point (i.e., any point that is presented with horizontal disparity to the left and right eyes).

Note that, as point B becomes farther and farther away, the value of $(d_L+d_R)$ approaches the IPD, and the apparent distance $D_B$ becomes infinite. If $d_L$ and/or $d_R$ continue to increase, $D_B$ will become negative. That is, in order to fuse such a stereoscopic image into a single object, the observer must diverge his eyes. This can be done to a very small extent without discomfort. Exceeding this extent means that the object will eventually break down into two separate left and right images, which obviously will not convey a sense of depth, and which may cause strain to the observer's eyes.

Analogously, the configuration of the stereoscopic viewing system can exaggerate the nearness of an object, making it difficult or impossible for the observer to converge his eyes on the image. Consequently, for any given camera configuration, there is a certain point close to the cameras which defines the nearest allowable point of the fusable stereoscopic region, and a certain point far from the cameras which will define the allowable furthest point of the stereoscopically viewable region.

The most straightforward criterion for specifying these limits is in terms of the maintaining comfortable rotation angles of the observer's eyes. In other words, the nearest point should have an image appear not closer than 15 cm away from the observer, and the farthest point should have an image appear at optical infinity. The maximum viewscreen disparity, disp, between the left and right images can therefore be calculated from the relationship:

$$\text{disp} = d_L - d_R \left(1 - \frac{D}{D_B}\right)$$

Using this equation to calculate the nearest and farthest fusable points for a particular camera configuration, distance from observer's eyes to viewscreen D and IPD, we observe that the maximum allowable disparity, disp, for $D_B$=infinity, is the IPD. Conversely, given values for the IPD and the viewing distance D, the minimum allowable parallax can also be calculated. $D_B$ is negative for images that appear in front of the viewing screen). Note that the fusable stereoscopic region can be increased by increasing the observer's viewing distance D.

As stated earlier, however, there are many reasons why this simple method of determining the usable stereoscopic range is inadequate. The potential problems of conflicting depth cues, such as stereopsis versus occlusion cues near the borders of the viewing screen, or convergence versus accommodation, or user eyestrain, provide compelling reasons to avoid objects appearing in front of the viewscreen when possible, for example. It is therefore desirable to restrict the stereoscopic range such that the viewscreen disparity disp for most points is greater than or equal to zero. That is, by this criterion, $D_B \geq D$, which implies that the nearest objects will appear on the surface of the viewscreen.

Referring to FIG. 10, the relationship between the real object distance $z_B$ 859 and the apparent distance $D_B$ 874 from the observer to the object viewed within the display can be referred to as the gain in the depth direction, defined as $K = D_B/z_B$. The parameter (or function) G, discussed earlier, describes the gain in the horizontal and/or vertical directions; that is, it describes the transformation upon the width and height of an object in transmission from the cameras to the viewing screen. The parameter K, the gain in the depth direction, describes what happens to the apparent location in three dimensional space of an object.

To a first approximation, letting the horizontal displacement of any point from the centre of the stereoscopic system be zero (i.e. x=0), the gain in the depth direction K can be evaluated by the equation:

$$K = \frac{(s^2 + cz)\frac{IPD}{2}D}{\left(\frac{IPD}{2}s^2 - \frac{IPD}{2}cz - csGf - szGf\right)z}$$

where z is the generalised distance from the centroid of the camera system to the point, and all other parameters are as previously defined. For K=1, the camera system is orthostereoscopic, and objects will appear to be as far away from the observer on the screen as they are from the cameras. For values of K less than one, the hypostereoscopic condition, the observer perceives objects to be closer than they really are. Conversely, for values of K greater than one, the hyperstereoscopic condition, depth is magnified, and objects will look further away.

Since in general different points on any object will appear at different distances within the visual field, the front and back of that object will also appear at different positions in depth. The larger K is, the greater the apparent distance from the front of an object to the back; that is, the object will appeared to be stretched. Similarly, for smaller K, objects will appear to be flattened. Under certain circumstances, these distorting effects can interfere with the task at hand.

The appropriate value for K to minimise these distortions is one for which the gain in the depth direction corresponds with that in the width and height directions. The gain in the width and height direction can be expressed as $g=G(f/z)$. The ratio K/g can be regarded as the depth distortion ratio of the stereoscopic system. When this ratio is approximately one, the object being viewed may appear to be either smaller or larger than its real size, but it will have the correct shape or proportions; that is, for example, a cube will remain a cube, and not be perceived as a rectangular prism.

To reduce the extent of an undesired depth distortion, it is necessary to adjust the camera parameters accordingly. If we assign (K/g)=1 and solve for c 816, the distance from the centroid of the cameras to their point of convergence, we obtain the equation $$c = \frac{\frac{IPD}{2}s^2D - \frac{IPD}{2}s^2Gf - szG^2f}{-\frac{IPD}{2}zD + \frac{IPD}{2}zGf - sG^2f}$$

Therefore, for situations requiring very little depth distortion, given an object or "focus of interest" at distance z from the centroid of the cameras, and given the distance D of the observer from the display surface, the gain G of the video system, the focal length of the lenses f, and the inter-pupillary distance IPD of the observer, it is possible, for a particular separation s of the cameras, to configure the cameras to minimise the depth distortion by using the value of c derived from the equation to prescribe the required camera convergence angle $2\phi$.

The human visual system is limited in its ability to detect differences in depth using only binocular disparity as a cue. Under ideal conditions subjects in the laboratory have been able to detect disparities of approximately 3 arc-seconds. Under normal conditions, the typical lower limit is between 10 and 20 arc-seconds. When the distance D of the observer from the viewing screen is 1 m, this corresponds to an equivalent disparity perceived within the viewing screen of between 0.05 mm and 0.1 mm. Because few display media have sufficient resolution to match this theoretical limit, the practical limit of depth resolution for most stereoscopic video systems is a function of the equipment used, and not of the human stereoscopic visual system.

The practical limit of depth resolution can be expressed as the smallest disparity between two points in the z direction which is discernible within the viewing screen. This will be a function of the particular hardware used, the ambient conditions and, to a limited extent, the distance of the observer from the viewing screen. Assuming ideal equipment, it will be independent of the position of points in the x or y directions on the viewing screen. Viewing screen disparity is defined as the distance between the left and right images, i.e. $disp = d_R + d_L$, as defined earlier. If the range of fusable viewing screen disparities is defined over the range from zero to the IPD, as discussed earlier, that is, $0 \leq disp \leq IPD$, and if the hardware limitations are such that the minimum discernible disparity is d, then there is only a fixed number of discriminable depths within the stereoscopic viewing region. This can be expressed as:

$$NDI = \frac{disp_{max} - disp_{min}}{\delta}$$

where NDI is the number of discriminable depth intervals, $disp_{min}$ is the minimum fusable viewing screen disparity, and $disp_{max}$ is the maximum fusable viewing screen disparity.

The relationship between each depth interval on the viewing screen and the corresponding depth interval in the real world is a function of the camera configuration. The magnitude of each interval is related to the square of the distance. For example, for a hypothetical stereoscopic video system with a minimum discernible disparity d of 1 mm, $disp_{min} = 0$ mm, and $disp_{max} = 65$ mm, the number of discriminable depth intervals in the fusable stereoscopic region is therefore $$NDI = \frac{(65 - 0)mm}{1\ mm} = 65$$

Therefore, if the object depth corresponding to $disp_{min} = 0$ is $z_{near} = 1$ m, and if the object depth corresponding to $disp_{max} = 65$ mm is $z_{far} = 11$ m, there will 65 discriminable depth regions within the 10 meter range, where the actual extent of each region increases monotonically with the square of the distance from the stereoscopic cameras.

To increase the effective depth resolution for a particular task, it is therefore necessary to force $z_{near}$ and $z_{far}$ closer together, thereby compressing the same number of depth intervals into a small range of distances. Examining the equations for calculating the screen parallax, it is seen that increasing the convergence angle of the cameras results in a compression of the fusable stereoscopic region.

Because, according to the present invention, it is possible for an observer to indicate where his focus of attention is, by using the Pointer Positioning Device 35 to move the Stereographic Pointer, and because the present invention provides for a dynamically controllable Camera Alignment System 50, the present invention now provides the possibility for the camera configuration parameters to be optimised relative to the task being performed by the user of the stereoscopic video system. This may be done either upon by request by the user or automatically, and either on a continuous basis or intermittently. Requests for particular resolution or fusable region requirements can clearly be communicated by means of conventional computer interface media. In all cases though, the Stereographic Pointer is used as an indicator of the user's focus of attention within the three dimensional video space. The user can therefore control the size of the fusable stereoscopic region, by causing the cameras to be adjusted to have higher resolution when necessary, at the cost of a smaller fusable region, or to have a wider fusable region when necessary, at the cost of fewer discriminable regions.

FIG. 11 depicts the Top View of a stereoscopic viewing system in a hypothetical working environment. Referring to FIG. 11a, the operator has used the Stereographic Pointer 831, in this particular example depicted as a small darkened triangle, to indicate that he wishes to focus in the vicinity of object C 830 with a fairly wide fusable region (and therefore only moderate resolution). Consequently, the cameras have been configured by the Optimisation Routine+Camera Control Logic Subsystem 37 so that the point of convergence of the cameras is in the vicinity of object C 830. In FIG. 11b, the operator has moved the Stereographic Pointer 831 to indicate that he is now interested in focussing in the region of object B 832 instead, but does not want to change the size of the fusable region. Consequently, the Optimisation Routine+ Camera Control Logic Subsystem 37 has adjusted the convergence point and the separation distance of the cameras accordingly, so that the convergence angle is similar to that of FIG. 11a. In FIG. 11c the user is still focussing in the vicinity of object B 832, but has requested additional resolution in that vicinity. The camera separation has consequently been widened. In FIG. 11d the operator is still focussing in the vicinity of object B 832, but has requested that the fusable range be increased to include object E 834, so that he can observe it also. FIG. 11e represents a general situation in which the user is moving the Stereographic Pointer 831 within the video scene and in which the cameras are dynamically tracking the Stereographic Pointer 831 as it moves around the scene. In that case, the Optimisation Routine+Camera Control Logic Subsystem 37 maintains the cameras continually converged at the position of the pointer, on the assumption that this is where the user is focussing his attention. In each of the examples illustrated in FIG. 11, by adjusting the camera configuration to meet the needs of the operator, the task of the operator is theoretically facilitated.

The embodiments of the invention in which an exclusive property or privilege is claimed are defined as follows:

1. A stereoscopic television system, comprising:
alternating-field video signal generating means for producing a standard video signal having alternating odd and even raster scan field video images, said alternating-field video signal generating means including a left camera for producing a left video image and a right camera for producing a right video image, each said left and right video images being comprising of alternating odd and even raster scan field video images, means for synchronizing said left and right cameras, means for aligning said left and right cameras, and alternating field combining circuit means for producing a composite standard video signal comprised of alternating video images from said left and right cameras;
a stereoscopic pointer image generator for generating a raster graphic output video signal of a virtual, stereographic pointer in the form of a complex three-dimensional image, said stereoscopic pointer image generator including computation means for generating said complex image in response to an input signal;
video synchronizing circuit means for receiving said composite standard video signal and delivering a synchronization signal to said computation means;
video keying circuit means for receiving said composite standard video signal and said graphic output video signal and superimposing said graphic output video signal onto said composite standard video signal to produce a single combined video signal, said single combined video signal allowing said graphic output video signal and said composite standard video signal to be viewed together simultaneously on the same video screen;
a video screen for displaying said composite standard video signal with said stereographic pointer superimposed thereon;
stereoscopic shuttering spectacles, for use by an observer, for separating odd and even raster scan field video images displayed on the video screen into left and right eye images respectively to allow the observer to perceive three dimensional images on a display screen; and
means for enabling the observer to communicate to said image generator, with three degrees of freedom, the desired location of said stereographic pointer within the perceived three dimensional images on said screen.

2. A stereoscopic television system as defined in claim 1, said complex image being in the form of arbitrary numeric and alphanumeric information about objects in said video scene and said image being disposed at various arbitrary depth planes within said scene whereby said information is displayed on-screen and in-depth.

3. A stereoscopic television system as defined in claim 1, said complex image being in the form of three-dimensional shapes.

4. A stereoscopic television system as defined in claim 1, said complex image being in the form of a wireframe overlayed over images of real objects in said scene for enhancing said images of real objects.

5. A stereoscopic television system as defined in claim 1, said complex image representing on-screen information about field intensities surrounding real objects displayed in said scene.

6. An interactive camera alignment control system for dynamically configuring the separation and convergence angle of a pair of cameras of a camera system so that the point of convergence of said cameras is as close as possible to the center of an observer's interest within a video scene produced by said cameras being viewed, said camera system including means for mounting said cameras for movement toward and away from one another and for angular displacement of their lines of sight from a reference plane and means responsive to electrical control signals for adjusting the separation and convergence angle of said cameras, said cameras being operable to produce first and second standard video signals having alternating odd and even raster scan field video images, comprising:
means for combining said first and second standard video signals to produce a composite standard video signal comprised of alternating even video images from one of said first and second cameras and odd images from the other of said first and second cameras;
a stereoscopic pointer image generator for generating a raster graphic output video signal of a virtual, stereographic pointer, said stereoscopic pointer image generator including computation means for generating said pointer in response to an input signal and an electrical output signal indicative of a point or region of interest within said scene;
video synchronizing circuit means for receiving said composite standard video signal and delivering a synchronization signal to said computation means;
video keying circuit means for receiving said composite standard video signal and said graphic output video signal and superimposing said graphic output video signal onto said composite standard video signal to produce a single combined video signal, said single combined video signal allowing said graphic output video signal and said composite standard video signal to be viewed together simultaneously on the same video screen;
a video screen for displaying said composite standard video signal with said stereographic pointer superimposed thereon;
stereoscopic shuttering spectacles, for use by an observer, for separating odd and even raster scan field video images displayed on the video screen into left and right eye images respectively to allow the observer to perceive three dimensional images on a display screen;
means for enabling the observer to communicate to said image generator, with three degrees of freedom, the desired location of said pointer within the perceived three dimensional images on said screen; and
means responsive to said electrical output signal for producing camera separation and convergence angle control signals and transmitting said control signals to said means responsive to electrical control signals whereby to cause adjustment of said camera separation and convergence angle.

7. A control system as defined in claim 6 said means for producing control signals being operable to produce control signals so as to move said cameras to a position which centres said point or region of interest video scene's field of view.

8. A control system as defined in claim 6, said means for producing control signals being operable to produce control signals so as to move said cameras to a position which cause said lines of sight to converge on said point or center of said region of interest.

9. A control system as defined in claim 6, further including means responsive to said electrical output signal indicative of the point or region of interest within said scene for computing the optimum separation and angle of convergence for that particular point or region of interest.

10. A control system as defined in claim 6, said means responsive to the coordinates of said pointer for producing the camera separation and convergence angle control signals being further responsive to signals representative of the focal length of the lenses of said cameras, the gain of the display system and the distance of the observer's eyes from the display surface.

11. A stereoscopic television system as defined in claim 6, further including a pair of parallel roman screws each having left and right hand threads thereon, one of said cameras being threadedly engaged with the left hand threads of said pair of screws and the other of said cameras being threadedly engaged with the right hand threads of said pair of screws whereby rotation of one or both of said screws being operable to angularly adjust said cameras with respect to one another, motor means for rotating said screws, controller means for controlling said motor means and computation means for producing and delivering camera alignment signals to said controller means.

* * * * *